US011548980B2

(12) United States Patent
Wang et al.

(10) Patent No.: US 11,548,980 B2
(45) Date of Patent: Jan. 10, 2023

(54) POLYESTER COPOLYMER

(71) Applicant: Avantium Knowledge Centre B.V., Amsterdam (NL)

(72) Inventors: Bing Wang, Amsterdam (NL); Gerardus Johannes Maria Gruter, Amsterdam (NL)

(73) Assignee: Avantium Knowledge Centre B.V., Amsterdam (NL)

( * ) Notice: Subject to any disclaimer, the term of this patent is extended or adjusted under 35 U.S.C. 154(b) by 186 days.

(21) Appl. No.: 16/610,861

(22) PCT Filed: May 18, 2018

(86) PCT No.: PCT/EP2018/063241
§ 371 (c)(1),
(2) Date: Nov. 4, 2019

(87) PCT Pub. No.: WO2018/211132
PCT Pub. Date: Nov. 22, 2018

(65) Prior Publication Data
US 2021/0139645 A1    May 13, 2021

(30) Foreign Application Priority Data
May 18, 2017   (NL) ..................................... 2018943

(51) Int. Cl.
C08G 63/672       (2006.01)
C08G 63/676       (2006.01)
C08G 63/82        (2006.01)

(52) U.S. Cl.
CPC ......... *C08G 63/672* (2013.01); *C08G 63/676* (2013.01); *C08G 63/82* (2013.01)

(58) Field of Classification Search
CPC ..... C08G 63/672; C08G 63/676; C08G 63/82
See application file for complete search history.

(56) References Cited

U.S. PATENT DOCUMENTS

| | | | |
|---|---|---|---|
| 10,114,303 B2 * | 10/2018 | Katsura | G03G 9/08782 |
| 2003/0204029 A1 | 10/2003 | Brandenburg et al. | |
| 2021/0403640 A1* | 12/2021 | Wang | C08G 63/672 |
| 2022/0017691 A1* | 1/2022 | Wang | C08G 63/16 |

FOREIGN PATENT DOCUMENTS

| JP | 2006161017 | * | 6/2006 |
|---|---|---|---|
| JP | 2006161017 A | | 6/2006 |

OTHER PUBLICATIONS

F. Fenouillota et al "Polymers from renewable 1,4:3,6-dianhydrohexitols (isosorbide, isomannide and isoidide): A review", Progress in Polymer Science 35 (2010) 578-622 (Year: 2010).*
Masahiko Okada et al "Biodegradable Polymers Based on Renewable Resources. IV. Enzymatic Degradation of Polyesters Composed of 1,4:3.6-Dianhydro-D-glucitol and Aliphatic Dicarboxylic Acid Moieties", Journal of Applied Polymer Science, vol. 77, 338-346 (2000) (Year: 2000).*
Garcia et al "Polyoxalates from biorenewable diols via Oxalate Metathesis Polymerization", Polym. Chem., 2014, 5, 955 (Year: 2014).*
Park et al "Synthesis and biocompatibility properties of polyester containing various diacid based on isosorbide", Journal of Biomaterials Applications, 27(1), pp. 99-109 (Year: 2012).*
Shinn-Jen Chang et al "Copolyesters. VII. Thermal Transitions of Poly (butylene terephthalate-co-isophthalate-co-adipates", Journal of Applied Polymer Science, vol. 51, 999-1004 (1994 (Year: 1994).*
Okada et al "Biodegradable Polymers Based on Renewable Resources: Polyesters Composed of 1,4 : 3,6-Dianhydrohexitol and Aliphatic Dicarboxylic Acid Units", Journal of Applied Polymer Science, vol. 62, 2257-2265 (1996) (Year: 1996).*
Finelli et al "Thermal properties of poly(butylene oxalate) copolymerized with azelaic acid", European Polymer Journal 38 (2002) 1987-1993 (Year: 2002).*
International Search Report and Written Opinion dated Aug. 21, 2018.

\* cited by examiner

*Primary Examiner* — Ling Siu Choi
*Assistant Examiner* — Gennadiy Mesh
(74) *Attorney, Agent, or Firm* — Suiter Swantz pc llo

(57) ABSTRACT

A polyester copolymer, having a number average molecular weight of equal to or more than 4000 gram/mole and having a glass transition temperature of less than 140° C., containing: (a) in the range from equal to or more than 45 mole % to equal to or less than 50 mole % of one or more bicyclic diol monomer units derived from the group consisting of isosorbide, isoidide, isomannide, 2,3:4,5-di-O-methylenegalactitol and 2,4:3,5-di-O-methylene-D-mannitol; (b) in the range from equal to or more than 25 mole % to equal to or less than 49.9 mole %, of an oxalate monomer unit; (c) in the range from equal to or more than 0.1 mole % to equal to or less than 25 mole % of one or more linear C3-C12 dicarboxylate monomer units; and (d) optionally equal to or more than 0 mole % to equal to or less than 5 mole % of one or more additional monomer units, the percentages based on the total amount of moles of monomer units within the polyester copolymer.

1 Claim, No Drawings

POLYESTER COPOLYMER

FIELD OF THE INVENTION

The invention relates to novel polyester copolymers, a process for the production of a polyester copolymer, a composition containing a polyester copolymer, a method for manufacturing an article using a polyester copolymer, and an article obtained or obtainable by such a method.

BACKGROUND TO THE INVENTION

In recent times a tendency has grown to obtain a variety of chemical products from sustainable resources. Polymers and monomers constitute an important part of chemical products produced in the world today, about 80% of the bulk chemicals are monomers or monomer precursors. They therefore play a central role in the transition to a sustainable chemical industry. The majority of polymers today are produced from fossil fuel feedstock, giving after use (via incineration or degradation) rise to extensive greenhouse gases emissions globally. The development of so-called sustainable, preferably partly or wholly bio-based, polymers, could contribute significantly to the development of a more sustainable chemical industry.

In the past, work has been done to develop (partially) bio-based poly(ethylene terephthalate) (PET). For example in WO2013/034743 a method for producing a bio-PET polymer is described. Such a process using bio-based terephthalic acid or bio-based terephthalic acid ester, however, remains too expensive to date to experience commercial success.

WO2015/142181 describes a polyester comprising at least one furandicarboxylate unit, at least one saturated, linear or branched, diol unit comprising from 2 to 10 carbon atoms and at least one bicyclic diol unit, chosen from isosorbide, isoidide, isomannide, 1,3:4,5-di-O-methylene-galactitol and 2,4:3,5-di-O-methylene-D-mannitol, characterized in that the glass transition temperature of said polyester is greater than or equal to 90° C. Although good results are obtained, also the preparation of this polyester remains expensive and it would be an advantage to have a further, economically more attractive, alternative.

In the article of Fenouillot et al, titled "Polymers from renewable 1,4:3,6-dianhydrohexitols (isosorbide, isomannide and isoidide): A review", published in Progress in Polymer Science Vol. 35 (2010) pages 578 to 622, it is indicated that 1,4:3,6-Dianhydrohexitols, such as isosorbide (1,4:3,6-dianhydro-D-glucidol), isomannide (1,4:3,6-dianhydro-D-mannitol) and isoidide (1,4:3,6-dianhydro-L-iditol), can be derived from renewable resources from cereal-based polysaccharides. It is indicated that in the field of polymeric materials, these diols are essentially employed to synthesize or modify polycondensates. Their attractive features as monomers are linked to their rigidity, chirality, non-toxicity and the fact that they are not derived from petroleum.

US2003/0204029 describes isosorbide-containing polyesters and a process to produce isosorbide-containing polyesters. The process described in US2003/0204029 to produce polyesters comprises melt mixing a first polyester which incorporates isosorbide comprised essentially of: 45.0 to 50.0 mole percent of a dicarboxylic acid component; 5.0 to 50.0 mole percent of isosorbide; 0 to 45.0 mole percent of a diol component other than ethylene glycol or di(ethylene glycol); and 0 to 5.0 mole percent of a polyfunctional branching agent component; with a second polyester comprised essentially of: 45.0 to 50.0 mole percent of a dicarboxylic acid component, 45.0-50.0 mole percent of a diol component other than isosorbide; and 0 to 5.0 mole percent of a polyfunctional branching agent component; at a temperature and for a time sufficient to effect transesterification, optionally followed by a finishing process. It also describes a polyester comprised essentially of 45 to 50 mole percent of a dicarboxylic acid component, 0.1 to 40 mole percent isosorbide, 10 to 49.9 mole percent of another diol component and 0 to 5.0 mole percent of a polyfunctional branching agent component. In its description US2003/0204029 mentions a long list of more than 50 dicarboxylic acid components that supposedly could be used in the production of the isosorbide-containing polyesters. In passing, US2003/0204029 also mentions oxalic acid and dimethyl oxalate as possible dicarboxylic acid components, but US2003/0204029 does not provide any enabling disclosure of how any polyester can be made with such oxalic acid and/or dimethyl oxalate. US2003/0204029 mentions that preferably the first polyester incorporating isosorbide is produced through a melt polymerization method. As explained below and illustrated in the examples of the present case, however, it is not possible to obtain any isosorbide-containing polyester with a commercially interesting molecular weight by melt polymerization when using the oxalic acid or dimethyl oxalate as mentioned in US2003/0204029 as a starting component. US2003/0204029 does therefore not avail society with the knowledge to prepare any polyester containing isosorbide and oxalate and hence cannot disclose such polyester to society.

US2010/0160548 describes a process for the production of a polyester by poly-condensation of a mixture comprising isoidide, and a dicarboxylic acid or dicarboxylic acid anhydride, wherein the reaction is performed in the melt of the monomers and wherein these monomers are not activated. As dicarboxylic acids, aliphatic di- or polyvalent carboxylic acids having 4 to 20 carbon atoms are mentioned. Oxalic acid or any oxalates are not mentioned.

JP2006161017 (a counterpart of WO2005/103111) is directed to the provision of an isosorbide type biodegradable polymer which has a sharply improved heat-resisting property and describes an isosorbide type polyoxalate with a glass transition temperature (Tg) of more than 160° C. It is indicated that the polyoxalate may contain an additional repeating unit, provided such additional repeating unit does not impair a glass transition temperature of 160° C. or more.

JP2006161017 indicates that the polyoxalate described can be manufactured by a polycondensation reaction with the isosorbide, oxalic acid or its derivative(s), such as an oxalic-acid diester or an oxalic-acid dichloride. When the polyoxalate contains an additional ester unit as an additional repeating unit, a part of the oxalic acid or a derivative thereof is replaced with an additional acid component in the polycondensation reaction. Also when the polyoxalate contains an additional ester unit as an additional repeating unit, part of the isosorbide is replaced with an additional alcohol component.

In the examples of JP2006161017 an oxalic acid diphenyl ester is reacted with isosorbide in the presence of a butyltin-hydroxyoxide hydrate catalyst to prepare a poly isosorbide oxalate polymer having a glass transition temperature of more than 160° C. The manufacture of polyoxalates with an additional repeating unit was not disclosed and no such polyoxalates with an additional repeating unit were exemplified.

The polymers of JP2006161017, having a high Tg of more than 160 degrees C., are very difficult to process in a commercial interesting manner.

It would be an advancement in the art to provide a novel polyester copolymer, with a commercially acceptable molecular weight and glass transition temperature, partially or completely derived from economically attractive monomers and/or to provide a novel economically attractive process for the production of such polyester copolymer. It would be an even further advancement if such polyester copolymer could, if so desired, be partially or completely derived from sustainably-sourced monomers.

SUMMARY OF THE INVENTION

Such a polyester copolymer has been obtained with the polyester copolymer according to the invention. Accordingly the present invention provides a polyester copolymer, having a number average molecular weight of equal to or more than 4000 grams/mole and having a glass transition temperature of less than 160° C., containing:
(a) in the range from equal to or more than 45 mole percent (mole %) to equal to or less than 50 mole %, based on the total amount of moles of monomer units within the polyester copolymer, of one or more bicyclic diol monomer units, wherein such one or more bicyclic diol monomer units is/are derived from one or more bicyclic diols chosen from the group consisting of isosorbide, isoidide, isomannide, 2,3:4,5-di-O-methylene-galactitol and 2,4:3,5-di-O-methylene-D-mannitol;
(b) in the range from equal to or more than 25 mole % to equal to or less than 49.9 mole %, based on the total amount of moles of monomer units within the polyester copolymer, of an oxalate monomer unit;
(c) in the range from equal to or more than 0.1 mole % to equal to or less than 25 mole %, based on the total amount of moles of monomer units within the polyester copolymer, of one or more linear C3-C12 dicarboxylate monomer units; and
(d) optionally equal to or more than 0 mole % to equal to or less than 5 mole %, based on the total amount of moles of monomer units within the polyester copolymer, of one or more additional monomer units.

Suitably the total amount of moles of monomer units in the polyester copolymer adds up to essentially 100 mole %, more preferably 100.0 mole %.

The oxalate monomer unit forms an economically attractive alternative for the above mentioned furandicarboxylate unit and terephthalate unit. Furthermore the polyester copolymer can be produced in an economically attractive process as described below. Advantageously, as illustrated in the examples, the novel polyester copolymer has a commercially acceptable molecular weight and glass transition temperature. In addition, if so desired, the oxalate monomer unit and/or the bicyclic diol monomer unit(s) and/or the linear C3-C12 dicarboxylate monomer unit(s) can be obtained and/or derived from a sustainable source, as described below.

Surprisingly, by varying the amount of oxalate monomer unit and the type and amount of linear C3-C12 dicarboxylate monomer units, the glass transition temperature (Tg) of the polyester copolymer can advantageously be targeted to a desired value in the range from equal to or more than minus 60° C. (−60° C.), preferably equal to or more than 20° C., to less than 160° C., preferably equal to or less than 150° C. and more preferably equal to or less than 140° C. The oxalate monomer unit and linear C3-C12 dicarboxylate monomer unit suitably work together in a synergetic manner, such that conveniently the targeted Tg can be obtained.

The novel polyester copolymer according to the invention can advantageously be used in industrial applications, such as in films, fibres, injection moulded parts and packaging materials. For example, when the polyester copolymer is targeted towards a glass transition temperature in the range from equal to or more than 100° C. to less than 160° C., preferably equal to or less than 140° C., the polyester copolymer can be very suitable for use in applications where a product, such as for example a film, fibre, injection moulded part or packaging material, needs to be heat-resistant, for example in the case of coffee cups, microwave applications and certain medical applications. When the polyester copolymer is targeted towards a glass transition temperature in the range from equal to or more than −60° C. to equal to or less than 100° C. or equal to or less than 80° C., the polyester copolymer can be very suitable for use in applications where a product needs to remain resilient at low temperatures and/or needs to be able to withstand cold without breaking or becoming too brittle, for example in the case of car-bumpers or outdoor furniture. When the polyester copolymer is targeted towards a glass transition temperature in the range from equal to or more than 60° C. to equal to or less than 120° C. or equal to or less than 100° C., the polyester copolymer can be very suitable for the replacement of poly(ethylene terephthalate) (PET) in applications such as bottles and/or containers.

Without wishing to be bound by any kind of theory, it is further believed that the polyester copolymer according to the invention may have a commercially interesting oxygen-permeation degree and/or may have an improved (bio-) degradability when compared to for example PET.

In addition, this present invention conveniently provides a process for producing such a polyester copolymer. Accordingly, the present invention provides a process for the production of a polyester copolymer comprising polymerizing the following monomers:
(i) in the range from equal to or more than 45 mole percent (mole %) to equal to or less than 50 mole %, based on the total amount of moles of monomers, of one or more bicyclic diols chosen from the group consisting of isosorbide, isoidide, isomannide, 2,3:4,5-di-O-methylene-galactitol and 2,4:3,5-di-O-methylene-D-mannitol;
(ii) in the range from equal to or more than 25 mole % to equal to or less than 49.9 mole %, based on the total amount of moles of monomers, of one or more oxalic diesters having a chemical structure according to formula (VI):

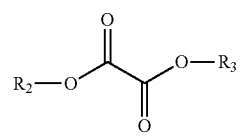

(VI)

wherein $R_2$ and $R_3$ each independently are a C3-C20 alkyl group, a C2-C20 alkenyl group, a C4-C20 cycloalkyl group, a C4-C20 aryl group or a C5-C20 alkylaryl group;
(iii) in the range from equal to or more than 0.1 mole % to equal to or less than 25 mole %, based on the total amount of moles of monomers, of one or more linear C3-C12 carboxylic diacids and/or derivatives thereof; and
(iv) optionally equal to or more than 0 mole % to equal to or less than 5 mole %, based on the total amount of moles of monomers, of one or more additional monomers.

Suitably the total amount of moles of monomers in the process adds up to essentially 100 mole %, more preferably 100.0 mole %.

In contrast to the process as described in US 2003/0204029, the use of a process according to the present invention advantageously allows one to provide an oxalate-containing polyester copolymer with a number average molecular weight equal to or more than 4000 grams/mole.

Conveniently the Tg of the produced polyester copolymer can be targeted to a desired value by tuning the amount of the one or more oxalic diesters and the type and amount of the one or more linear C3-C12 carboxylic diacids and/or derivatives thereof. Advantageously polyester copolymers with a commercially acceptable number average molecular weight can be obtained within commercially acceptable reaction times. Without wishing to be bound by any kind of theory, it is believed that by using mainly or solely the bicyclic diols as monomers, and by using nearly no or completely no other diols in the reaction mixture, the reaction rate of the above process may advantageously be essentially determined by the reaction rate of the bicyclic diols and remains essentially independent from the amount of oxalic diesters and the type and amount of the one or more linear C3-C12 carboxylic diacids (or derivatives thereof) used. It is believed that this advantageously allows one to target the glass transition temperature (Tg) of the produced polyester copolymer independently from the number average molecular weight (Mn) of the polyester copolymer.

As will be described in more detail below, preferably the one or more oxalic diesters are diesters of oxalic acid and one or more alkanols, which alkanols have an acid dissociation constant (pKa) of equal to or less than 20.0, more preferably equal to or less than 15.0.

The invention further provides a polyester copolymer, preferably obtained or obtainable by means of the above process, having a number average molecular weight of equal to or more than 4000 grams/mole and having a glass transition temperature of less than 160° C., containing the following repeating units:

- in the range from equal to or more than 45.0 mole % to equal to or less than 99.9 mole %, based on the total amount of moles of repeating units within the polyester copolymer, of one or more bicyclic diol-oxalate repeating units chosen from the group consisting of isosorbide-oxalate, isoidide-oxalate, isomannide-oxalate, 2,3:4,5-di-O-methylene-galactitol-oxalate and 2,4:3,5-di-O-methylene-D-mannitol-oxalate;
- in the range from equal to or more than 0.1 mole % to equal to or less than 50.0 mole %, based on the total amount of moles of repeating units within the polyester copolymer, of one or more bicyclic diol-linear C3-C12 dicarboxylate repeating units;
- optionally in the range from equal to or more than 0.0 mole % to equal to or less than 5.0 mole %, based on the total amount of moles of repeating units within the polyester copolymer, of one or more additional repeating units;
- wherein the molar ratio of bicyclic diol-oxalate repeating units to bicyclic diol-linear C3-C12 dicarboxylate repeating units is equal to or more than 1:1, more preferably equal to or more than 1.5:1.

Suitably the total amount of moles of repeating units within the polyester copolymer adds up to essentially 100 mole %, more preferably 100.0 mole %.

In addition, the invention provides a composition containing any one of the polyester copolymer(s) as described above and in addition one or more additives and/or one or more additional polymers.

Further the invention provides a method for manufacturing an article, comprising the use of one or more polyester copolymers according to the invention.

Still further, the invention provides an article obtained or obtainable by such a method for manufacturing an article as described above.

DETAILED DESCRIPTION OF THE INVENTION

By a "polyester" is herein understood a polymer comprising a plurality of monomer units linked via ester functional groups in its main chain. An ester functional group can be formed by reacting an hydroxyl group (—OH), sometimes also referred to as an alkanol group, with a carboxyl group (—C(=O)OH), sometimes also referred to as an carboxylic acid group. By a polyester copolymer is herein understood a polyester wherein three or more types of monomer units are joined in the same polymer main chain.

As will be described in more detail in the claims and herein below, the polyester copolymer according to the invention suitably contains one or more bicyclic diol monomer units (as mentioned under (a)), an oxalate monomer unit (as mentioned under (b)), and one or more linear C3-C12 dicarboxylate monomer units (as mentioned under (c)). In addition, the polyester copolymer can optionally contain one or more distinct additional monomer units (as mentioned under (d)). As mentioned below, however, it is also possible for the polyester copolymer according to the invention to essentially or solely consist of the one or more bicyclic diol monomer units (as mentioned under (a)), the oxalate monomer unit (as mentioned under (b)), and the one or more linear C3-C12 dicarboxylate monomer units (as mentioned under (c)). That is, it is possible for the polyester copolymer to be devoid of any other additional monomer units.

By a "monomer unit" is herein understood a unit as included in the polyester copolymer, which unit can be obtained after polymerization of a monomer, that is, a "monomer unit" is a constitutional unit contributed by a single monomer or monomer compound to the structure of the polymer.

By a "monomer" or "monomer compound" is herein understood the starting compound to be polymerized.

Unless explicitly indicated otherwise, a "Cx" compound is herein understood to be a compound having "x" carbon atoms. Similarly, a "Cy" compound is herein understood to be a compound having "y" carbon atoms. Unless explicitly indicated otherwise, a "Cx-Cy" compound is therefore herein understood to be a compound having in the range from equal to or more than "x" to equal to or less than "y" carbon atoms. For the avoidance of doubt, it is therefore well possible for a Cx-Cy compound to contain more than "x" or less than "y" carbon atoms.

Herein below the monomer units will be described one by one.

The first monomer unit (as listed under (a)), may suitably comprise one or more bicyclic diol monomer units, wherein such one or more bicyclic diol monomer units is/are suitably derived from one or more bicyclic diols chosen from the group consisting of (IA)

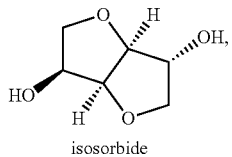
isosorbide (IB)

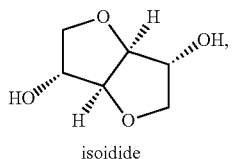
isoidide (IC)

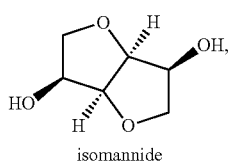
isomannide (ID)

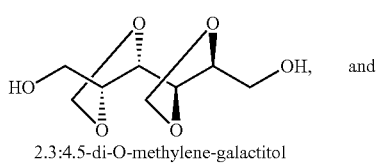
2,3:4,5-di-O-methylene-galactitol and (IE)

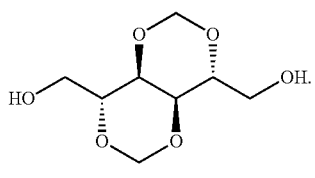
2,4:3,5-di-O-methylene-D-mannitol

Such derived monomer unit may herein sometimes also be referred to "bicyclic diol-derived monomer unit" or simply as "bicyclic diol unit". More preferably the one or more bicyclic diol monomer units is/are one or more 1,4:3,6-dianhydrohexitol monomer units, wherein such one or more bicyclic diol monomer units is/are derived from one or more 1,4:3,6-dianhydrohexitols. Such bicyclic diol monomer unit derived from one or more 1,4:3,6-dianhydrohexitols can herein sometimes also be referred to as "1,4:3,6-dianhydrohexitol-derived monomer unit" or simply as "1,4:3,6-dianhydrohexitol unit". More suitably the term "1,4:3,6-dianhydrohexitol monomer unit", "1,4:3,6-dianhydrohexitol-derived monomer unit" or "1,4:3,6-dianhydrohexitol unit" may refer to monomer units chosen from the group of monomer units of the formulae (IIA), (IIB) and/or (IIC):

(IIA)

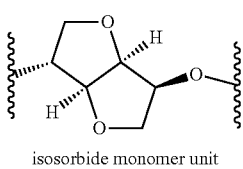
isosorbide monomer unit

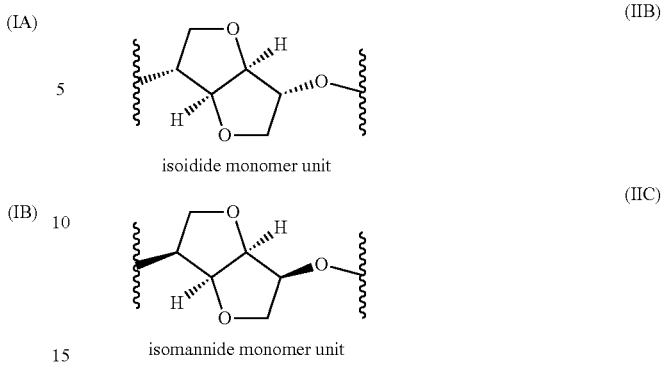

The isosorbide monomer unit exemplified in formulae (IIA) can, within the polyester copolymer, exist in two three-dimensional structures as exemplified in paragraphs [0021] and [0022] of JP2006161017, and both structures are included herein by reference.

Examples of suitable 1,4:3,6-dianhydrohexitols include isosorbide (1,4:3,6-dianhydro-D-glucidol), isomannide (1,4:3,6-dianhydro-D-mannitol), isoidide (1,4:3,6-dianhydro-L-iditol) and mixtures thereof. The most significant difference among the 1,4:3,6-dianhydrohexitol isomers may be the orientation of the two "hydroxyl" groups. This difference in orientation can result in different orientations of the ester group in the polymer, allowing for several variations in spatial configuration and physical and chemical properties of the polymer. As indicated above, it is possible for the polyester copolymer to contain only one isomer of 1,4:3,6-dianhydrohexitol-derived monomer unit or to contain a mixture of two or more isomers of 1,4:3,6-dianhydrohexitol-derived monomer units, for example a mixture of monomer units derived from isosorbide and/or isomannide and/or isoidide (also sometimes referred to herein as respectively isosorbide unit, isomannide unit and/or isoidide unit).

Preferably, the one or more 1,4:3,6-dianhydrohexitol monomer units is/are derived from isosorbide and/or isoidide. More preferably, however, the polyester copolymer only contains one isomer of a 1,4:3,6-dianhydrohexitol-derived monomer unit. More preferably the 1,4:3,6-dianhydrohexitol-derived monomer unit is a monomer unit derived from isosorbide or isoidide. Still more preferably the 1,4:3,6-dianhydrohexitol-derived monomer unit is a monomer unit derived from isosorbide (also sometimes referred to herein as isosorbide unit). Most preferably the polyester copolymer only contains monomer units derived from isosorbide and essentially no monomer units derived from isomannide and/or isoidide.

The bicyclic diol, and especially the 1,4:3,6-dianhydrohexitol, is preferably obtained and/or derived from a sustainable biomass material. By a biomass material is herein understood a composition of matter obtained and/or derived from a biological source as opposed to a composition of matter obtained and/or derived from petroleum, natural gas or coal.

The biomass material can for example be a polysaccharide, such as starch, or a cellulosic and/or lignocellulosic material. By sustainable is herein understood that the material is harvested and/or obtained in a manner such that the environment is not depleted or permanently damaged. Sustainable biomass material may for example be sourced from forest waste, agricultural waste, waste paper and/or sugar processing residues.

Isosorbide, isomannide and isoidide can be suitably obtained by dehydrating respectively sorbitol, mannitol and iditol.

The synthesis of these 1,4:3,6-dianhydrohexitols is well known: different routes are described, for example, in the papers by Fletcher et al. (*1,4,3,6-Hexitol dianhydride, 1-isoidide, J. Am. Chem. Soc.*, 1945, 67, 1042-3 and also *1,4,3,6-dianhydro-l-iditol and the structure of isomannide and isosorbide, J. Am. Chem. Soc.*, 1946, 68, 939-41), by Montgomery et al. (*Anhydrides of polyhydric alcohols. IV. Constitution of dianhydrosorbitol, J. Chem. Soc.*, 1946, 390-3 and *Anhydrides of polyhydric alcohols. IX. Derivatives of 1,4-anhydrosorbitol from 1,4,3,6-dianhydrosorbitol, J. Chem. Soc.*, 1948, 237-41), by Fleche et al. (*Isosorbide. Preparation, properties and chemistry, Starch/Staerke*, 1986, 38, 26-30) and by Fukuoka et al. (*Catalytic conversion of cellulose into sugar alcohols, Angew. Chem. Int. Ed.*, 2006, 45, 5161-3), and in U.S. Pat. No. 3,023,223.

For its part, the 2,3:4,5-di-O-methylene-galactitol can be obtained by acetalization and then reduction of galactaric acid, as described by Lavilla et al. in *Bio-based poly (butylene terephthalate) copolyesters containing bicyclic diacetalized galactitol and galactaric acid: Influence of composition on properties, Polymer*, 2012, 53(16), 3432-3445. For its part, the 2,4:3,5-di-O-methylene-D-mannitol can be obtained by acetalization of D-mannitol by formaldehyde, as described by Lavilla et al. in *Bio-Based Aromatic Polyesters from a Novel Bicyclic Diol Derived from D-Mannitol, Macromolecules*, 2012, 45, 8257-8266.

The polyester copolymer preferably contains in the range from equal to or more than 45.0 mole % to equal to or less than 50.0 mole %, based on the total amount of moles of monomer units within the polyester copolymer, of one or more bicyclic diol-derived monomer units, preferably 1,4:3,6-dianhydrohexitol-derived monomer units. More preferably the polyester copolymer contains in the range from equal to or more than 49.0 mole % to equal to or less than 50.0 mole % of bicyclic diol monomer units, preferably 1,4:3,6-dianhydrohexitol monomer units, based on the total amount of moles of monomer units within the polyester copolymer. The percentages here are unit percentages, also referred to sometimes as mole unit percentages. That is, the percentages are calculated in "moles" of monomer units.

In addition to the bycyclic diol monomer unit, preferably the 1,4:3,6-dianhydrohexitol monomer unit, one or more other diol monomer units may be present as optional additional monomer units, for example in an amount from equal to or more than 0.1 mole % to equal to or less than 5.0 mole %, as described in more detail below. Preferably, however, the polyester copolymer contains essentially no such other diol monomer units. That is, preferably the polyester copolymer is devoid of any diol monomer units other than the bicyclic diol monomer unit, more preferably devoid of any diol monomer units other than 1,4:3,6-dianhydrohexitol monomer units.

The second monomer unit (as listed under (b)), suitably comprises an oxalate monomer unit. Such oxalate monomer unit may have a chemical structure according to formula (III):

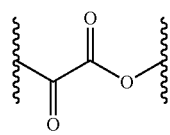

(III)

Such oxalate monomer unit is herein sometimes also referred to as simply "oxalate unit".

The oxalate monomer unit is preferably obtained and/or derived from a sustainable source. For example the oxalate monomer may be obtained and/or derived from a sustainable biomass material. For example, by use of fungi, such as described in the article of Liaud et al., titled "Exploring fungal biodiversity: organic acid production by 66 strains of filamentous fungi", published in *Fungal Biology and Biotechnology* (2014) (published online), an oxalic acid may be produced which may be converted into an oxalic diester by conventional means. It is, however, also possible for the oxalate monomer to be obtained and/or derived from carbon monoxide and/or carbondioxide ($CO_2$), for example by means of electrochemical conversion. For example WO 2014/100828 and WO2015184388 describe the electrochemical conversion of CO2 to oxalate and oxalic acid and their contents are herein incorporated by reference. Such CO2 is considered a sustainable source.

The polyester copolymer preferably contains in the range from equal to or more than 25.0 mole % to equal to or less than 49.9 mole % of an oxalate monomer unit, based on the total amount of moles of monomer units within the polyester copolymer.

The amounts of oxalate monomer unit and linear C3-C12 dicarboxylate monomer units can advantageously be targeted towards a desired Tg. For some applications the polyester copolymer is preferably a polyester copolymer containing in the range from equal to or more than 25.0 mole % to equal to or less than 45.0 mole %, more preferably equal to or less than 35.0 mole %, based on the total amount of moles of monomer units within the polyester copolymer, of an oxalate monomer unit. For other applications the polyester copolymer is preferably a polyester copolymer containing in the range from equal to or more than 35.0 mole % to equal to or less than 49.9 mole %, more preferably equal to or less than 45.0 mole %, based on the total amount of moles of monomer units within the polyester copolymer, of an oxalate monomer unit. As indicated above, the percentages here are unit percentages, also referred to sometimes as mole unit percentages.

Preferably the molar ratio of oxalate monomer units to linear C3-C12 dicarboxylate monomer units is equal to or more than 1:1, preferably equal to or more than 1.5:1.

The third monomer unit (as listed under (c)), suitably comprises a linear C3-C12 dicarboxylate monomer unit. Such linear C3-C12 dicarboxylate monomer unit may for example have a chemical structure according to formula (IV):

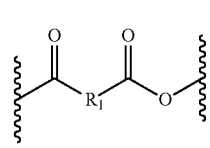

(IV)

wherein $R_1$ is a linear organic group. Preferably $R_1$ is a bivalent linear aliphatic, respectively olefinic, hydrocarbon radical. More preferably $R_1$ is a bivalent linear aliphatic hydrocarbon radical. Such a bivalent aliphatic group is sometimes also referred to as an "alkylene" group.

$R_1$ may or may not include one or more heteroatoms, such as oxygen (O), sulphur (S) and combinations thereof, within the backbone carbon chain. If a heteroatom is present in the backbone carbon chain, such heteroatom is preferably oxygen.

Preferably $R_1$ comprises a straight backbone carbon chain with no substituents.

Such linear C3-C12 dicarboxylate monomer unit is herein sometimes also referred to as simply "linear C3-C12 dicarboxylate unit".

As mentioned above, it is possible for the polyester copolymer to contain only one distinct type of linear C3-C12 dicarboxylate monomer unit, but it is also possible for the polyester copolymer to contain a mixture of two or more distinct types of linear C3-C12 dicarboxylate monomer units.

As explained above, by a C3-12 dicarboxylate monomer unit is understood a dicarboxylate monomer unit having in the range from equal to or more than 3 to equal to or less than 12 carbon atoms. As example of a linear C3-C12 dicarboxylate monomer unit, the polyester copolymer can for example also comprise a linear C3-C10 dicarboxylate monomer unit (that is, a linear dicarboxylate monomer unit having in the range from equal to or more than 3 to equal to or less than 10 carbon atoms).

By a linear dicarboxylate is herein preferably understood a non-cyclic essentially straight-chain dicarboxylate.

The linear C3-C12 dicarboxylate monomer unit can be a linear dicarboxylate monomer unit having an even or odd number of carbon atoms, for example 2, 3, 4, 5, 6, 7, 8, 9, 10, 11 or 12 carbon atoms. Preferably the linear C3-C12 dicarboxylate monomer unit is a linear dicarboxylate monomer unit having a chemical structure according to formula (IV), wherein $R_1$ is an alkylene group with structure $—[CH_2]_n—$, wherein n suitably represents a number of $—[CH_2]—$ units and wherein n is a number in the range from 1 to 10. The number n can be an even or odd number and suitably n can be 1, 2, 3, 4, 5, 6, 7, 8, 9 or 10. Examples of suitable linear C3-C12 dicarboxylate monomer units include malonate (propanedioate), succinate (butanedioate), glutarate (pentanedioate), adipate (hexanedioate), pimelate (heptanedioate), suberate (octanedioate), azelate (nonanedioate), sebacate (decanedioate), undecanedioate, dodecanedioate, 2-butenedioate, 2-hexenedioate, 2,4-hexadienedioate and mixtures of two or more thereof.

More preferably the linear C3-C12 dicarboxylate monomer unit comprises a succinate monomer unit, adipate monomer unit, suberate monomer unit, sebacate monomer unit or a mixture of one or more of these. Even more preferably the linear C3-C12 dicarboxylate monomer unit comprises a succinate monomer unit, adipate monomer unit or a mixture thereof. Most preferably the polyester copolymer contains only one type of linear C3-C12 dicarboxylate monomer unit, and most preferably such linear C3-C12 dicarboxylate monomer unit is a succinate monomer unit or an adipate monomer unit.

The linear C3-C12 dicarboxylate monomer unit may suitable be derived from a linear C3-C12 carboxylic diacid or a derivative (such as for example an acidester or diester) thereof.

The linear C3-C12 dicarboxylate monomer unit is preferably obtained and/or derived from a sustainable source. For example the C3-C12 dicarboxylate monomer unit may be obtained and/or derived from a sustainable biomass material. For example, WO 2009/065778 describes the production of succinic acid in a eukaryotic cell.

The polyester copolymer preferably contains in the range from equal to or more than 0.1 mole % to equal to or less than 25.0 mole %, based on the total amount of moles of monomer units within the polyester copolymer, of one or more linear C3-C12 dicarboxylate monomer units. More preferably, the polyester copolymer contains in the range from equal to or more than 1 mole %, more preferably equal to or more than 3 mole % and most preferably equal to or more than 5 mole % to equal to or less than 25 mole %, more preferably equal to or less than 25.0 mole %, based on the total amount of moles of monomer units within the polyester copolymer, of one or more linear C3-C12 dicarboxylate monomer units. As indicated above, the percentages here are unit percentages, also referred to sometimes as mole unit percentages. That is, the percentages are calculated in "moles" of monomer units.

As indicated above, the amounts of oxalate monomer unit and the amount and type of linear C3-C12 dicarboxylate monomer units can conveniently be targeted towards a desired Tg value. For some applications the polyester copolymer is preferably a polyester copolymer containing in the range from equal to or more than 5.0 mole %, more preferably equal to or more than 15.0 mole %, to equal to or less than 25.0 mole %, based on the total amount of moles of monomer units within the polyester copolymer, of linear C3-C12 dicarboxylate monomer units. For other applications the polyester copolymer is preferably a polyester copolymer containing in the range from equal to or more than 0.1 mole %, more preferably equal to or more than 5.0 mole %, to equal to or less than 15.0 mole %, based on the total amount of moles of monomer units within the polyester copolymer, of linear C3-C12 dicarboxylate monomer units.

In addition to the one or more bicyclic diol monomer units, oxalate monomer unit and one or more linear C3-C12 dicarboxylate monomer units, the polyester copolymer may optionally contain one or more additional monomer units (as listed under (d)). Such additional monomer units are sometimes also referred to as "additional units".

Optionally the polyester copolymer may for example contain equal to or more than 0.0 mole % to equal to or less than 5.0 mole %, based on the total amount of moles of monomer units within the polyester copolymer, of such one or more additional monomer units.

For example, the polyester copolymer may suitably contain one or more crosslinking monomer units. Such optional crosslinking monomer units may be advantageous for increasing the polymer melt viscosity of the polyester copolymer. A higher polymer melt viscosity may in some cases be advantageous, for example when the polymer is melt extruded and/or for the preparation of films, fibers, injection moulded parts and/or packaging materials such as containers. Examples of such optional crosslinking monomer units include monomer units derived from crosslinking compounds having three or more carboxylic acid functions, hydroxyl functions or a mixture thereof, such as for example 1,2,4-benzenetricarboxylic acid, trimethyl-1,2,4-benzenetricarboxylate, 1,2,4-benzenetricarboxylic anhydride, 1,3,5-benzenetricarboxylic acid, 1,2,4,5-benzenetetracarboxylic acid, 1,2,4,5-benzenetetracarboxylic dianhydride, 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis(hydroxymethyl)propionic acid.

If one or more optional crosslinking monomer units are present, the polyester copolymer preferably contains in the range from equal to or more than 0.1 mole % to equal to or less than 5.0 mole % of a crosslinking monomer unit, based on the total amount of moles of monomer units within the polyester copolymer. More preferably the polyester copolymer contains in the range from equal to or more than 0.1 mole % to equal to or less than 2.0 mole % of crosslinking monomer unit, based on the total amount of moles of monomer units within the polyester copolymer. In a preferred embodiment essentially no crosslinking monomer units are present.

The additional monomer units can also comprise one or more hydroxy acid monomer units, derived from one or more hydroxy acid compounds.

For example, the polyester copolymer may contain hydroxy acid monomer units derived from hydroxyl acid compounds such as for example glycolic acid, lactic acid, hydroxybutyric acid, hydroxycaproic acid, hydroxyvaleric acid, 7-hydroxyheptanoic acid, 8-hydroxyoctanoic acid, 9-hydroxynonanoic acid, hydroxymethylfurancarboxylic acid or hydroxybenzoic acid units or a mixture of these hydroxy acids. If present, the percentage of hydroxy acid monomer units, based on the total amount of moles of monomer units of the polyester copolymer, is preferably equal to or less than 5.0 mole %, more preferably equal to or less than 1.0 mole %. Most preferably the polyester copolymer contains essentially no hydroxy acid monomer units. That is, the polyester copolymer according to the invention can be devoid of hydroxy acid monomer unit.

As indicated above, the additional monomer units may optionally also comprise one or more diols other than the bicyclic diol. If present, the additional monomer units can for example also comprise one or more linear C2-C12 diol monomer units, derived from one or more linear C2-C12 diols such as ethylene glycol (ethane-1,2-diol), diethylene glycol (2,2'-Oxydi(ethan-1-ol), propane-1,2-diol, propane-1,3-diol, dipropylene glycol (4-Oxa-2,6-heptandiol) or mixtures thereof. If present, the polyester copolymer preferably contains in the range from equal to or more than 0.0 mole % to equal to or less than 5.0 mole %, more preferably equal to or less than 1.0 mole %, based on the total amount of moles of monomer units within the polyester copolymer, of one or more linear C2-C12 diol monomer units. Most preferably the polyester copolymer contains essentially no such linear C2-C12 diol monomer units. That is, the polyester copolymer according to the invention can be devoid of any linear C2-C12 diol monomer units. Even more preferably the polyester copolymer is devoid of any diol monomer units other than the bicyclic diol monomer units.

The additional monomer units may optionally also comprise one or more dicarboxylate monomer units other than the oxalate monomer unit or linear C3-C12 dicarboxylate monomer unit. If present, the additional monomer units can for example also comprise furan dicarboxylate monomer unit, terephthalate monomer unit or a mixture of one or more of these. If present, the polyester copolymer preferably contains in the range from equal to or more than 0.0 mole % to equal to or less than 5.0 mole %, more preferably equal to or less than 1.0 mole %, based on the total amount of moles of monomer units within the polyester copolymer, of one or more other dicarboxylate monomer units. Most preferably the polyester copolymer contains essentially no such other dicarboxylate monomer units. That is, the polyester copolymer according to the invention is preferably devoid of any dicarboxylate monomer units other than the oxalate monomer units (as listed under (b)) and/or the linear C3-C12 dicarboxylate monomer units (as listed under (c)).

The additional monomer units can also comprise one or more chain extending monomer units. By a "chain extending" monomer unit is herein understood a monomer unit comprising functional groups other than hydroxyl, carboxylic acid and/or ester, which functional groups are capable of reacting with these same functional groups in another type of polymer. Examples include for example functional groups such as isocyanate and/or imide functions. The polyester copolymer may or may not include such chain extending monomer units. If present, the polyester copolymer preferably contains in the range from equal to or more than 0.0 mole % to equal to or less than 5.0 mole %, more preferably equal to or less than 1.0 mole %, based on the total amount of moles of monomer units within the polyester copolymer, of one or more chain extending monomer units. Possibly the polyester copolymer contains essentially no such chain extending monomer units.

Preferably the total weight percentage of any additional monomers units is equal to or less than 1 weight percent (wt %), more preferably equal to or less than 0.1 wt % and even more preferably equal to or less than 0.01 wt % of the total weight of the polyester copolymer. Most preferably polyester copolymer contains essentially no additional monomers units.

That is, preferably the polyester copolymer is a polyester copolymer, having a number average molecular weight of equal to or more than 4000 grams/mole and having a glass transition temperature of less than 160° C., essentially consisting of or solely consisting of:

(a) in the range from equal to or more than 45.0 mole percent (mole %) to equal to or less than 50.0 mole %, based on the total amount of moles of monomer units within the polyester copolymer, of one or more bicyclic diol monomer units, wherein such one or more bicyclic diol monomer units is/are derived from one or more bicyclic diols chosen from the group consisting of isosorbide, isoidide, isomannide, 2,3:4,5-di-O-methylene-galactitol and 2,4:3,5-di-O-methylene-D-mannitol;

(b) in the range from equal to or more than 25.0 mole % to equal to or less than 49.9 mole %, based on the total amount of moles of monomer units within the polyester copolymer, of an oxalate monomer unit; and (c) in the range from equal to or more than 0.1 mole % to equal to or less than 25.0 mole %, based on the total amount of moles of monomer units within the polyester copolymer, of one or more linear C3-C12 dicarboxylate monomer units.

Suitably the total amount of moles of monomer units in the polyester copolymer adds up to essentially 100 mole %, more preferably 100.0 mole %.

Preferably the ratio of moles of oxalate monomer units (as listed under (b)) to moles of linear C3-C12 dicarboxylate monomer unit (as listed under (c)), i.e. the oxalate monomer unit: linear C3-C12 dicarboxylate monomer unit molar ratio, is equal to or more than 1:1, more preferably equal to or more than 1.5:1.

The amounts of oxalate monomer unit and linear C3-C12 dicarboxylate monomer units can advantageously be targeted towards a desired Tg. For some applications (for example, where a higher Tg may be desired) it can be advantageous for the polyester copolymer to be a polyester copolymer wherein the molar ratio of oxalate monomer units to linear C3-C12 dicarboxylate monomer units is preferably equal to or more than 2:1 and equal to or less than 20:1, or equal to or less than 10:1. For other applications (for example, where a lower Tg may be desired) it can be advantageous for the polyester copolymer to be a polyester copolymer wherein the molar ratio of oxalate monomer units to linear C3-C12 dicarboxylate monomer units is preferably equal to or more than 1:1 or equal to or more than 1.5:1 and equal to or less than 2:1.

The amounts of each of the different monomer units in the polyester copolymer can be determined by proton nuclear magnetic resonance ($^1$H NMR). One skilled in the art would easily find the conditions of analysis to determine the amount of each of the different monomer units in the polyester copolymer.

The polyester copolymer can be a random copolymer or a block copolymer.

The number average molecular weight (Mn) of the polyester copolymer may vary widely and may depend for example on the catalyst, reaction time and reaction temperature.

The polyester copolymer according to the invention preferably has a number average molecular weight of equal to or more than 8000 grams/mole, more preferably of equal to or more than 9000 grams/mole, even more preferably of equal to or more than 10000 grams/mole, still more preferably equal to or more than 15000 grams/mole, yet more preferably equal to or more than 17000 grams/mole, and still even more preferably of equal to or more than 20000 grams/mole, and preferably of equal to or less than 150000 grams/mole, even more preferably of equal to or less than 100000 grams/mole. The weight average molecular weight and number average molecular weight can conveniently be determined through gel permeation chromatography (GPC) at 25° C. using polystyrene standards and using a mixture of chloroform and 2-chlorophenol in a volumetric ratio of 6:4 (chloroform:2-chlorophenol) as eluent. All molecular weights herein are determined as described under the analytical methods section of the examples.

Suitably the polyester copolymer according to the present invention may have a polydispersity index (that is, the ratio of weight average molecular weight (Mw) to number average molecular weight (Mn), i.e. Mw/Mn) in the range from equal to or more than 1.6 to equal to or less than 2.6.

The polyester copolymer(s) according to the invention preferably has/have a glass transition temperature (Tg) equal to or more than minus 60° C. (−60° C.), more preferably equal to or more than minus 20° C. (−20° C.), still more preferably equal to or more than 20° C. and/or less than 160° C., preferably equal to or less than 150° C., still more preferably equal to or less than 140° C., yet still more preferably equal to or less than 135° C. and possibly equal to or less than 130° C.

For some applications, such as for example glue, car bumpers, outdoor furniture or some films, it may be advantageous for the polyester copolymer to be a polyester copolymer having a glass transition temperature in the range from equal to or more than minus 60° C. (−60° C.), preferably equal to or more than minus 20° C. (−20° C.), possibly even equal to or more than 20° C., to equal to or less than 100° C., more preferably equal to or less than 80° C. For other applications, such as for example injection molded parts or (other) heat-resistance requiring applications, it may be advantageous for the polyester copolymer to be a polyester copolymer having a glass transition temperature in the range from equal to or more than 60° C., more preferably equal to or more than 80° C., still more preferably equal to or more than 100° C., to less than 160° C., more preferably equal to or less than 140° C., still more preferably equal to or less than 130° C. or yet still more preferably equal to or less than 120° C. For still other applications, such as for example the replacement of PET bottles, it may be advantageous for the polyester copolymer to be a polyester copolymer having a glass transition temperature in the range from equal to or more than 60° C. to equal to or less than 120° C. or equal to or less than 100° C. Advantageously the glass transition temperature (Tg) of the polyester copolymer according to the invention does not need to be fixed and can be targeted, for example by varying the amounts of the different type of monomer units (a), (b), (c) and optionally (d), to a specific desired Tg, as described in detail above. Advantageously, the glass transition temperature (Tg) may, if so desired, even be varied whilst the molecular weight could be maintained essentially unchanged, preferably at a commercially interesting high number average molecular weight (Mn).

The glass transition temperature of the polyester copolymer can conveniently be measured by conventional methods, in particular by using differential scanning calorimetry (DSC) with a heating rate of 10° C./minute in a nitrogen atmosphere. All glass transition temperatures herein are determined as described under the analytical methods section of the examples.

Preferably the polyester copolymer as a whole is (via its monomers) partially or completely obtained and/or derived from one or more sustainable sources, preferably from sustainable biomass material and/or carbon monoxide and/or carbon dioxide. More preferably the polyester copolymer is completely obtained and/or derived from such one or more sustainable sources. Preferably the polyester copolymer is obtained and/or derived, in part or in whole, from sources other than coal, gas or petroleum.

The polyester copolymer can advantageously be produced by the process for the production of a polyester copolymer as described herein above under the summary of the invention. More preferably the polyester copolymer can be produced by a process for the production of a polyester copolymer preferably comprising polymerizing the following monomers:

(i) in the range from equal to or more than 45.0 mole percent (mole %) to equal to or less than 50.0 mole %, based on the total amount of moles of monomers, of one or more bicyclic diols chosen from the group consisting of isosorbide, isoidide, isomannide, 2,3:4,5-di-O-methylene-galactitol and 2,4:3,5-di-O-methylene-D-mannitol;

(ii) in the range from equal to or more than 25.0 mole % to equal to or less than 49.9 mole %, based on the total amount of moles of monomers, of one or more oxalic diesters having a chemical structure according to formula (VI):

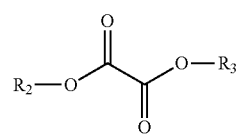

(VI)

wherein $R_2$ and $R_3$ each independently are a C3-C20 alkyl group, a C2-C20 alkenyl group, a C4-C20 cycloalkyl group, a C4-C20 aryl group or a C5-C20 alkylaryl group;

(iii) in the range from equal to or more than 0.1 mole % to equal to or less than 25.0 mole %, based on the total amount of moles of monomers, of one or more linear C3-C12 carboxylic diacids and/or a derivative thereof; and (iv) optionally equal to or more than 0.0 mole % to equal to or less than 5.0 mole %, based on the total amount of moles of monomers, of one or more additional monomers.

The process for the production of a polyester copolymer can comprise melt polymerization and/or solid state polymerization.

For example, the process can comprise melt mixing of the monomers in the presence of a metal-containing catalyst (also referred to herein as melt polymerization).

The polyester copolymer according to the invention can for example be produced by a process for the production of a polyester copolymer comprising melt mixing of the monomers, at a temperature in the range from equal to or more than 175° C., more preferably equal to or more than 180° C., and even more preferably equal to or more than 190° C. to equal to or less than 300° C., more preferably equal to or less than 275° C., and even more preferably equal to or less than 250° C. in the presence of a metal-containing catalyst. The melt mixing can suitably be carried out in a reactor. Hence the melt mixing may suitably be preceded by an introduction stage, wherein the monomers are introduced into a reactor, and succeeded by a recovery stage, wherein the polyester copolymer is recovered from a reactor.

The process for the production of the polyester copolymer can also comprise a combination of melt polymerization and solid state polymerization, wherein the polyester copolymer product of a melt polymerization step is followed by a solid state polymerization step.

Preferences for the one or more bicyclic diols (as listed under (i)) are as mentioned in the text relating to the bicyclic diol monomer unit above. Preferably the one or more bicyclic diols is/are one or more 1,4:3,6-dianhydrohexitols. For example the bicyclic diol may be a 1,4:3,6-dianhydrohexitol having a chemical structure according to formula(V)

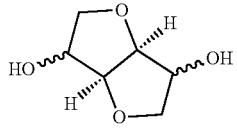

(V)

As mentioned above, examples of suitable 1,4:3,6-dianhydrohexitols include isosorbide (1,4:3,6-dianhydro-D-glucidol), isoidide (1,4:3,6-dianhydro-L-iditol), isomannide (1,4:3,6-dianhydro-D-mannitol) and mixtures thereof. These may have structures according to formulae (IA), (IB) and (IC) as described above. It is possible to include a mixture of two or more isomers of 1,4:3,6-dianhydrohexitols, for example a mixture of isosorbide and/or isomannide and/or isoidide. Preferably, however, only one isomer of 1,4:3,6-dianhydrohexitol is used. More preferably the 1,4:3,6-dianhydrohexitol is/are isosorbide and/or isoidide. Still more preferably the 1,4:3,6-dianhydrohexitol is an isosorbide.

The one or more 1,4:3,6-dianhydrohexitols are preferably obtained and/or derived from a sustainable source, preferably from a sustainable biomass material. Further preferences are as described in the text relating to the 1,4:3,6-dianhydrohexitol monomer unit.

In the process according to the invention preferably in the range from equal to or more than 45.0 mole % to equal to or less than 50.0 mole %, of bicyclic diol, respectively 1,4:3,6-dianhydrohexitol, based on the total amount of moles of monomers, are used. More preferably in the range from equal to or more than 49.0 mole % to equal to or less than 50.0 mole %, of bicyclic diol, preferably 1,4:3,6-dianhydrohexitol, based on the total amount of moles of monomers, may be used.

As indicated above, in addition to the one or more bicyclic diols, one or more other diols may be used in a low amount, for example in an amount from equal to or more than 0.1 mole % to equal to or less than 5.0 mole %, based on the total amount of moles of monomers. Preferably, however, the process according to the invention is carried out in the essential absence of any other diols, that is, it is carried out in the essential absence of any diols other than the one or more bicyclic diols, or (in the preferred case) the one or more 1,4:3,6-dianhydrohexitols.

The oxalic diester (as listed under (ii)) may suitably have a chemical structure according to formula (VI):

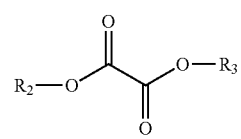

(VI)

wherein $R_2$ and $R_3$, each independently, are a C3-C20 alkyl group, a C2-C20 alkenyl group, a C4-C20 cycloalkyl group, a C4-C20 aryl group or a C5-C20 alkylaryl group.

Preferably $R_2$ and $R_3$, each independently, are a C2-C20 alkenyl group.

Preferably $R_2$ and $R_3$, each independently, are a group having a chemical structure according to formula (X):

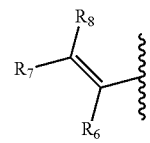

(X)

wherein $R_6$, $R_7$ and Ra, each independently, represent hydrogen or a C1-C6 alkyl group, or wherein $R_6$ and $R_7$ together or $R_6$ and Ra together form a C4-C20 cycloalkyl group, a C4-C20 aryl group or a C5-C20 alkylaryl group.

For example, $R_6$, $R_7$ and $R_8$, each independently, can represent hydrogen or a C1-C4 alkyl group. It is also possible for $R_6$ and $R_7$ together or $R_6$ and Ra together to form a C5-C10 cycloalkyl group, a C5-C10 aryl group or a C5-C10 alkylaryl group.

More preferably, at least one of $R_2$ and $R_3$, and preferably both of $R_2$ and $R_3$, are chosen from the group consisting of n-propyl, iso-propyl, n-butyl, iso-butyl, tert-butyl, n-pentyl, iso-pentyl, tert-butyl, phenyl, methylphenyl, ethylphenyl, vinyl (ethenyl), allyl (2-propenyl) and/or 1-propenyl. Most preferably at least one of $R_2$ and $R_3$, and preferably both of $R_2$ and $R_3$, are phenyl, methylphenyl, allyl and/or vinyl.

Preferably the oxalic diester is a diester of oxalic acid and an alkanol, wherein the alkanol has a pKa of equal to or less than 20.0, more preferably equal to or less than 16.0, even more preferably equal to or less than 15.0 and still more preferably equal to or less than 12.0, such as for example phenol (pKa 10.0), 2-methyl phenol (pKa 10.3), 3-methyl phenol (pKa 10.1), 4-methyl phenol (pKa 10.3), vinyl alcohol (ethenol, pKa 10.5) and/or allyl alcohol (Prop-2-en-1-ol). As a practical minimum the pKa is preferably equal to or more than 7.0.

Most preferably the oxalic diester is di(phenyl)oxalate, di(methylphenyl)oxalate, di(allyl)oxalate, di(vinyl) oxalate, monomethylmonophenyloxalate or a mixture of one or more thereof.

It is possible to include a mixture of two or more oxalic diesters for example a mixture of di(phenyl)oxalate, di(methylphenyl)oxalate, di(allyl)oxalate and/or di(vinyl)

oxalate. Preferably, however, only one oxalic diester is used, most preferably only di(phenyl)oxalate, only di(methylphenyl)oxalate, only di(allyl)oxalate or only di(vinyl) oxalate is used.

The one or more oxalic diesters are preferably obtained and/or derived from a sustainable source, preferably from a sustainable biomass material. Preferences are as described in the text relating to the oxalate monomer unit above.

It is especially preferred for the oxalic diester monomer to be a oxalic diester obtained and/or derived from carbon monoxide and/or carbondioxide ($CO_2$), for example with the help of an electrochemical conversion. For example WO 2014/100828 and WO2015184388 describe the electrochemical conversion of $CO_2$ to oxalate and oxalic acid and their contents are herein incorporated by reference. The therein mentioned oxalate and oxalic acid can be converted to an oxalic diester by conventional means.

In the process according to the invention preferably in the range from equal to or more than 25.0 mole % to equal to or less than 49.9 mole % of oxalic diester, based on the total amount of moles of monomers, can be used. Preferences are as explained above. For some applications a range from equal to or more than 25.0 mole % to equal to or less than 45.0 mole %, more preferably equal to or less than 35.0 mole % of oxalic diester, based on the total amount of moles of monomers, is preferred. For other applications a range from equal to or more than 35.0 mole % to equal to or less than 49.9 mole %, more preferably equal to or less than 45.0 mole % of oxalic diester, based on the total amount of moles of monomers, is preferred.

Preferences for the one or more linear C3-C12 carboxylic diacids and/or derivatives thereof (as listed under (iii)) are as described in the text relating to the linear C3-C12 dicarboxylate monomer above. The linear C3-C12 carboxylic diacid may herein also be referred to as simply "C3-C12 diacid". By a linear C3-C12 carboxylic diacid is herein understood a linear carboxylic diacid having in the range from equal to or more than 3 to equal to or less than 12 carbon atoms. As example of a linear C3-C12 carboxylic diacid one could for example also use a linear C3-C10 carboxylic diacid (that is, a linear carboxylic diacid having in the range from equal to or more than 3 to equal to or less than 10 carbon atoms).

By a carboxylic diacid is herein suitably understood an organic compound having two carboxyl groups. Examples of derivatives include for example acidesters and diesters thereof. By an acidester derivative is herein suitably understood a derivative of the linear C3-C12 carboxylic diacid, wherein one carboxyl group has been replaced by an ester group. By a diester derivative is herein suitably understood a derivative of the linear C3-C12 carboxylic diacid, wherein both carboxyl groups have been replaced by an ester group. By a linear C3-C12 carboxylic diacid is herein preferably understood a non-cyclic essentially straight-chain C3-C12 carboxylic diacid. If, however, an acidester or diester derivative thereof is used, such ester group may be cyclic, aromatic, non-straight and/or bulky, as explained in more detail below.

The one or more linear C3-C12 carboxylic diacids and/or derivatives thereof may preferably have a chemical structure according to formula (VII):

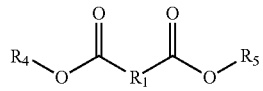

(VII)

wherein $R_1$ is a linear organic group, as described above for formula (IV) and $R_4$ and $R_5$ are each independently hydrogen or a C1-C20 alkyl group, a C2-C20 alkenyl group, a C4-C20 cycloalkyl group, a C4-C20 aryl group or a C5-C20 alkylaryl group.

Preferences for $R_1$ are as described above for formula (IV). Preferably, the linear C3-C12 carboxylic diacid or derivative thereof has a chemical structure according to formula (VII), wherein $R_1$ is an alkylene group with structure —$[CH_2]_n$—, wherein n suitably represents the number of —$[CH_2]$— units and wherein n is a number in the range from 1 to 10. The number n can be an even or odd number and suitably n can be 1, 2, 3, 4, 5, 6, 7, 8, 9 or 10.

Preferably at least one of $R_4$ and $R_5$, and more preferably both $R_4$ and $R_5$, is/are a C3-C20 alkyl group, a C2-C20 alkenyl group, a C4-C20 cycloalkyl group, a C4-C20 aryl group or a C5-C20 alkylaryl group. Even more preferably, at least one of $R_4$ and $R_5$ and preferably both of $R_4$ and $R_5$, are chosen from the group consisting of n-propyl, iso-propyl, n-butyl, iso-butyl, tert-butyl, n-pentyl, iso-pentyl, tert-butyl, phenyl, methylphenyl, ethyl phenyl, vinyl (ethenyl), allyl (2-propenyl) and/or 1-propenyl.

Possibly $R_4$ and $R_5$, each independently, can be a group having a chemical structure according to formula (X) as described above.

Most preferably at least one of $R_4$ and $R_5$, and preferably both of $R_4$ and $R_5$, are phenyl, methylphenyl, allyl and/or vinyl.

Linear C3-C12 carboxylic diacids, such as for example succinic acid, adipic acid or maleic acid can be used, but preferably an acid ester or diester of such a linear C3-C12 carboxylic diacid is used. That is, the monomer listed under (iii) in the process according to the invention is preferably an acidester or diester (also referred to as an acidester-derivative, respective, diester-derivative) of a linear C3-C12 carboxylic diacid. More preferably the monomer listed under (iii) is a diester of a linear C3-C12 carboxylic diacid.

Examples of suitably diesters of such a linear C3-C12 carboxylic diacid include dipropylmalonate, dibutylmalonate, diphenylmalonate, di(methylphenyl)malonate, di(ethylphenyl)malonate, di(vinyl)malonate, methylpropylmalonate, methylbutylmalonate, methylphenylmalonate, ethylpropylmalonate, ethylbutylmalonate, ethylphenylmalonate, dipropylsuccinate, dibutylsuccinate, diphenylsuccinate, di(methylphenyl)succinate, di(ethylphenyl)succinate, di(vinyl)succinate, methylpropylsuccinate, methylbutylsuccinate, methylphenylsuccinate, ethylpropylsuccinate, ethylbutylsuccinate, ethylphenylsuccinate, dipropylglutarate, dibutylglutarate, diphenylglutarate, di(methylphenyl)glutarate, di(ethylphenyl)glutarate, di(vinyl)glutarate methylpropylglutrate, methylbutylglutrate, methylphenylglutrate, ethylpropylglutrate, ethylbutylglutrate, ethylphenylglutrate dipropyladipate, dibutyladipate, diphenyladipate, di(methylphenyl)adipate, di(ethylphenyl)adipate, di(vinyl)adipate, methylpropyladipate, methylbutyladipate, methylphenyladipate, ethylpropyladipate, ethylbutyladipate, ethylphenyladipate, dipropylpimelate, dibutylpimelate, diphenylpimelate, di(methylphenyl)pimelate, di(ethylphenyl)pimelate, di(vinyl)pimelate, methylpropylpimelate, methylbutylpimelate, methylphenylpimelate, ethylpropylpimelate, ethylbutylpimelate, ethylphenylpimelate, dipropylsuberate, dibutylsuberate, diphenylsuberate, di(methylphenyl)suberate, di(ethylphenyl)suberate, di(vinyl)suberate, methylpropylsuberate, methylbutylsuberate, methylphenylsuberate, ethylpropylsuberate, ethylbutylsuberate, ethylphenylsuberate, dipropylazelate, dibutylazelate, diphenylazelate, di(methylphenyl)azelate, di(ethylphenyl)azelate, di(vinyl)azelate, methylpropylazelate, methylbutylazelate, methylphenylazelate, ethylpropylazelate, ethylbutylazelate, ethylphenylazelate, dipropylsebacate, dibutylsebacate, diphenylsebacate, di(methylphenyl)sebacate, di(ethylphenyl)sebacate, di(vinyl)sebacate, methylpropylsebacate, methylbutylsebacate, methylphenylsebacate, ethylpropylsebacate, ethylbutylsebacate, ethylphenylsebacate, dipropylundecanoate, dibutylundecanoate, diphenylundecanoate, di(methylphenyl)undecanoate, di(ethylphenyl)undecanoate, di(vinyl)undecanoate, methylpropylundecanoate, methylbutylundecanoate, methylphenylundecanoate, ethylpropylundecanoate, ethylbutylundecanoate, ethylphenylundecanoate, dipropyldodecanoate, dibutyldodecanoate, diphenyldodecanoate, di(methylphenyl) dodecanoate, di(ethylphenyl)dodecanoate, di(vinyl)dodecanoate, methylpropyldodecanoate, methylbutyldodecanoate, methylphenyldodecanoate, ethylpropyldodecanoate, ethylbutyldodecanoate, ethylphenyldodecanoate, dipropyl-2-butenedioate, dibutyl-2-butenedioate, diphenyl-2-butenedioate, di(methylphenyl)-2-butenedioate, di(ethylphenyl)-2-butenedioate, di(vinyl)-2-butenedioate, methylpropyl-2-butenedioate, methylbutyl-2-butenedioate, methylphenyl-2-butenedioate, ethylpropyl-2-butenedioate, ethylbutyl-2-butenedioate, ethylphenyl-2-butenedioate, dipropyl-2-hexenedioate, dibutyl-2-hexenedioate, diphenyl-2-hexenedioate, di(methylphenyl)-2-hexenedioate, di(ethylphenyl)-2-hexenedioate, di(vinyl)-2-hexenedioate, methylpropyl-2-hexenedioate, methylbutyl-2-hexenedioate, methylphenyl-2-hexenedioate, ethylpropyl-2-hexenedioate, ethylbutyl-2-hexenedioate, ethylphenyl-2-hexenedioate, dipropyl-2,4-hexadienedioate, dibutyl-2,4-hexadienedioate, diphenyl-2,4-hexadienedioate, di(methylphenyl)-2,4-hexadienedioate, di(ethylphenyl)-2,4-hexadienedioate, di(vinyl)-2,4-hexadienedioate, methylpropyl-2,4-hexadienedioate, methylbutyl-2,4-hexadienedioate, methylphenyl-2,4-hexadienedioate, ethylpropyl-2,4-hexadienedioate, ethylbutyl-2,4-hexadienedioate, ethylphenyl-2,4-hexadienedioate and mixtures thereof.

More preferably such a diester of a linear C3-C12 carboxylic diacid is a succinate diester, adipate diester, adipate diester, suberate diester or sebacate diester or a mixture of one or more of these. Even more preferably such a diester of a linear C3-C12 carboxylic diacid is a succinate diester or adipate diester or a mixture thereof. More preferably only one such diester of a linear C3-C12 carboxylic diacid is used in the process according to the invention, and even more preferably such one diester of a linear C3-C12 carboxylic diacid is a succinate diester or an adipate diester. Most preferably the diester of the linear C3-C12 carboxylic diacid is di(phenyl)succinate, di(phenyl)adipate, di(methylphenyl)succinate, di(methylphenyl)adipate, di(allyl)succinate, di(allyl)adipate, di(vinyl)succinate and/or di(vinyl)adipate.

As mentioned above, it is preferred to use only one such diester of a linear C3-C12 carboxylic diacid in the process according to the invention, but it is also possible to use a mixture of two or more distinct diesters of one or more C3-C12 carboxylic diacids in the process.

The one or more linear C3-C12 carboxylic diacids and/or derivatives thereof are preferably obtained and/or derived from a sustainable source, preferably from a sustainable biomass material. Preferences are as described in the text relating to the linear C3-C12 dicarboxylate monomer units described above.

In the process according to the invention preferably in the range from equal to or more than 0.1 mole % to equal to or less than 25 mole %, more preferably to equal to or less than 25.0 mole %, of one or more linear C3-C12 carboxylic diacids and/or derivatives thereof, based on the total amount of moles of monomers, are used. More preferably in the range from equal to or more than 1 mole %, still more preferably equal to or more than 3 mole %, and even more preferably equal to or more than 5 mole %, or equal to or more than 10 mole % to equal to or less than 25 mole %, more preferably equal to or less than 25.0 mole % of one or more linear C3-C12 carboxylic diacids and/or derivatives thereof, based on the total amount of moles of monomers, are used. It is, however, also possible to use in the range from equal to or more than 1.0 mole % to equal to or less than 15.0 mole % of one or more linear C3-C12 carboxylic diacids and/or derivatives thereof, based on the total amount of moles of monomers Further preferences are as explained above for the linear C3-C12 dicarboxylate monomer units. For some applications a range from equal to or more than 5.0 mole %, more preferably equal to or more than 15.0 mole %, to equal to or less than 25.0 mole %, of one or more linear C3-C12 carboxylic diacids and/or derivatives thereof, based on the total amount of moles of monomers, is preferred. For other applications a range from equal to or more than 0.1 mole %, more preferably equal to or more than 5.0 mole %, to equal to or less than 15.0 mole % of one or more linear C3-C12 carboxylic diacids and/or derivatives thereof, based on the total amount of moles of monomers, is preferred.

In addition to the one or more bicyclic diols, one or more oxalic diesters and one or more linear C3-C12 carboxylic diacids and/or derivatives thereof, optionally one or more additional monomers can be used in the process of the invention.

For example, as additional monomer, one or more crosslinking compounds, precursors for the above mentioned crosslinking monomer units, can optionally be added. Preferences for the type of such crosslinking compounds are as described above. If one or more optional crosslinking compounds are present, they are preferably present in the range from equal to or more than 0.1 mole % to equal to or less than 5.0 mole % of a crosslinking compound, based on the total amount of moles of monomers, more preferably in the range from equal to or more than 0.1 mole % to equal to or less than 2.0 mole % of crosslinking compound, based on the total amount of moles of monomers. In a preferred embodiment essentially no crosslinking compounds are present. That is, preferably the process according to the invention is carried out in the essential absence of such a crosslinking compound.

The additional monomer(s) can also comprise one or more hydroxy acid compounds. Preferences for the type of such hydroxy acid compounds are as described above. If present, the amount of hydroxy acid compounds, based on the total amount of monomers, is preferably equal to or less than 5.0 mole %, more preferably equal to or less than 1.0 mole %. More preferably essentially no hydroxy acid compounds are present.

The additional monomer(s) can also comprise one or more linear C2-C12 aliphatic or olefinic diols. Examples of suitable linear C2-C12 aliphatic or olefinic diols include butane-1,4-diol, hexane-1,6-diol, diethyleneglycol, triethyleneglycol or a mixture of one or more of these. If present, the amount of linear C2-C12 aliphatic or olefinic diols, based on the total amount of monomers, is preferably in the range from equal to or more than 0.0 mole % to equal to or less than 5.0 mole %, more preferably equal to or less than 1.0 mole %. More preferably, essentially no linear C2-C12 aliphatic or olefinic diols are present. Even more preferably essentially no diol monomers other than the bicyclic diol monomers are present.

The process according to the invention may be carried out in the presence of one or more additives, such as stabilizers, for example light stabilizers, UV stabilizers and heat stabilizers, fluidifying agents, flame retardants and antistatic. Other additives include primary and/or secondary antioxidants. A primary antioxidant can for example be a sterically hindered phenol, such as the compounds Hostanox® 0 3, Hostanox® 0 10, Hostanox® 0 16, Ultranox® 210, Ultranox®276, Dovernox® 10, Dovernox® 76, Dovernox® 3114, Irganox®1010 or Irganox®1076. A secondary antioxidant can for example be a trivalent phosphorous-comprising compounds, such as Ultranox® 626, Doverphos® S-9228 or Sandostab® P-EPQ.

The process according to the invention may comprise several stages. Suitably the process according to the invention may comprise a transesterification stage and a polycondensation stage, wherein the transesterification stage is carried out prior to the polycondensation stage. The transesterification stage may suitably be preceded by an introduction stage, wherein the above monomers, such as the bicyclic diol monomer(s), oxalic diester monomer(s), linear C3-C12 carboxylic diacid, acidester or diester monomer(s) and optional additional monomer(s), are introduced into a reactor. The polycondensation stage may suitably be succeeded by a recovery stage, wherein the polyester copolymer is recovered from a reactor.

The process according to the invention can be carried out in a batch-wise, semi-batchwise or continuous mode. The transesterification stage and the polycondensation stage may conveniently be carried out in one and the same reactor, but may also be carried out in two separate reactors, for example where the transesterification stage is carried out in a first transesterification reactor and the polycondensation stage is carried out in a second polycondensation reactor.

The process according to the invention may thus suitably comprise the following stages:

an introduction stage, wherein the bicyclic diol monomer(s), oxalic diester monomer(s), linear C3-C12 carboxylic diacid and/or derivative monomer(s) and optional additional monomer(s), are introduced into a reactor;

a transesterification stage, wherein the monomers are reacted in a transesterification reaction, and optionally a pre-polycondensation reaction, to thereby produce oligomers;

a polycondensation stage, wherein the oligomers are reacted further in a polycondensation reaction to thereby produce the polyester copolymer; and a recovery stage, wherein the polyester copolymer is recovered from the reactor.

The polycondensation stage may suitably be carried out at a temperature equal to or higher than the temperature at which the transesterification stage is carried out. The transesterification stage may for example be carried out at a temperature in the range from equal to or more than 165° C., more preferably equal to or more than 180° C., and even more preferably equal to or more than 190° C., to equal to or less than 200° C. The polycondensation stage may suitably succeed the transesterification stage and the polycondensation stage can for example be carried out at a temperature in the range from equal to or more than 195° C., more preferably equal to or more than 200° C., to equal to or less than 275° C., more preferably equal to or less than 255° C. and most preferably equal to or less than 235° C.

Any transesterification stage is preferably carried out over a reaction time in the range from equal to or more than 0.5 hour, more preferably equal to or more than 1.0 hour, to equal to or less than 6.0 hour, more preferably equal to or less than 4.0 hour. During a transesterification stage, the temperature may be stepwise or gradually increased.

Any polycondensation stage is preferably carried out over a reaction time in the range from equal to or more than 0.5 hour, more preferably equal to or more than 1.0 hour, to equal to or less than 8.0 hours, more preferably equal to or less than 6.0 hours. During a polycondensation stage, the temperature may be stepwise or gradually increased.

In any introduction stage the monomers can be introduced into the reactor simultaneously, for example in the form of a feed mixture, or in separate parts. The monomers can be introduced into the reactor in a molten phase or they can be molten and mixed after introduction into the reactor.

The polycondensation stage may be succeeded by a recovery stage, wherein the polyester copolymer as described above is recovered from the reactor. The polyester can for example be recovered by extracting it from the reactor in the form of a string of molten polymer. This string can be converted into granules using conventional granulation techniques.

The transesterification stage and/or polycondensation stage are preferably carried out under an inert gas atmosphere.

More preferably the transesterification stage and/or polycondensation stage are carried out at a reduced pressure.

The transesterification stage, and/or any optional pre-polymerization reaction, may for example be carried out at a pressure in the range from equal to or more than 10.0 mbar (10.0 millibar, corresponding to 1.00 KiloPascal), more preferably equal to or more than 100 mbar (corresponding to 10.0 KiloPascal), to equal to or less than 1.00 bar (corresponding to 100 KiloPascal), more preferably equal to or less than 400 mbar (corresponding to 40.0 KiloPascal). The polycondensation stage may for example be carried out at a pressure in the range from equal to or more than 0.01 mbar (corresponding to 1 Pascal), more preferably equal to or more than 0.1 mbar (corresponding to 10 Pascal) to equal to or less than 10.0 mbar (corresponding to 1.0 KiloPascal), more preferably equal to or less than 5.0 mbar (corresponding to 500 Pascal).

The process according to the invention is suitably carried out in the presence of a metal-containing catalyst. Such metal-containing catalyst may for example comprise derivatives of tin (Sn), titanium (Ti), zirconium (Zr), germanium (Ge), antimony (Sb), bismuth (Bi), hafnium (Hf), magnesium (Mg), cerium (Ce), zinc (Zn), cobalt (Co), iron (Fe), manganese (Mn), calcium (Ca), strontium (Sr), sodium (Na), lead (Pb), potassium (K), aluminium (Al), and/or lithium (Li). Examples of suitable metal-containing catalysts include salts of Li, Ca, Mg, Mn, Zn, Pb, Sb, Sn, Ge, and Ti, such as acetate salts and oxides, including glycol adducts, and Ti alkoxides. Examples of such compounds can, for example, be those given in US2011282020A1 in sections [0026] to [0029], and on page 5 of WO 2013/062408 A1. Preferably the metal-containing catalyst is a tin-containing catalyst, for example a tin(IV)-containing or tin(II)-containing catalyst. More preferably the metal-containing catalyst is an alkyltin(IV) salt and/or alkyltin(II) salt. Examples include alkyltin(IV) salts, alkyltin(II) salts, dialkyltin(IV) salts, dialkyltin(II) salts, trialkyltin(IV) salts, trialkyltin(II) salts or a mixture of one or more of these. These tin(IV) and/or tin(II) catalysts may be used with alternative or additional metal-containing catalysts. Examples of alternative or additional metal-containing catalysts that may be used include one or more of titanium(IV) alkoxides or titanium(IV) chelates, zirconium(IV) chelates, or zirconium(IV) salts (e.g. alkoxides); hafnium(IV) chelates or hafnium(IV) salts (e.g. alkoxides); yttrium(III) alkoxides or yttrium(III) chelates; lanthanum(III) alkoxides or lanthanum chelates; scandium(III) alkoxides or chelates; cerium(III) alkoxides or cerium chelates. An exemplary metal-containing catalyst is n-butyltin-hydroxideoxide.

In a preferred process the one or more bicyclic diols is/are first reacted with the one or more oxalic diesters in the presence of a metal-containing catalyst under polymerization conditions (including for example a temperature in the range from 150° C. to 210° C.) to produce a bicyclic diol-oxalate ester product, whereafter the bicyclic diol-oxalate ester product is subsequently reacted with the one or more linear C3-C12 carboxylic diacids and/or derivatives thereof in the presence of a metal-containing catalyst under further polymerization conditions (including for example a temperature in the range from 200° C. to 255° C.) to produce the polyester copolymer. The metal-containing catalyst may suitably be as described before.

For example the process may comprise:
reacting the one or more bicyclic diols, in the presence of a metal-containing catalyst under polymerization conditions (including for example a temperature in the range from 150° C. to 210° C.), with the one or more oxalic diesters having a chemical structure according to formula (VI):

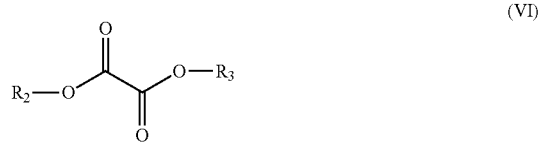

wherein $R_2$ and $R_3$, each independently, are a C3-C20 alkyl group, a C2-C20 alkenyl group, a C4-C20 cycloalkyl group, a C4-C20 aryl group or a C5-C20 alkylaryl group, to yield a bicyclic diol-oxalate ester product; and
subsequently reacting the bicyclic diol-oxalate ester product with one or more linear C3-C12 carboxylic diacids and/or derivatives thereof in the presence of a metal-containing catalyst under further polymerization conditions (including for example a temperature in the range from 200° C. to 255° C.) to produce the polyester copolymer.

Further preferences are as described above.

In an alternative process the one or more bicyclic diols is/are first reacted with the one or more oxalic diesters in the presence of a metal-containing catalyst under polymerization conditions (including for example a temperature in the range from 150° C. to 210° C.), suitably in a first reactor, to form a first ester product. In parallel therewith, suitably in a second reactor, the one or more bicyclic diols is/are reacted with the one or more linear C3-C12 carboxylic diacids and/or derivatives thereof in the presence of a metal-containing catalyst under polymerization conditions (including for example a temperature in the range from 150° C. to 210° C.) to form a second ester product. The metal-containing catalyst may suitably be as described before. In a subsequent step the first ester product and the second ester product are combined and subjected to further polymerization and/or transesterification in the presence of a metal-containing catalyst (for example at a temperature in the range from 200° C. to 255° C.) to produce the polyester copolymer.

The process according to the invention can further comprise, after a recovery stage (i.e. wherein the polyester copolymer is recovered from the reactor) as described above, a stage of polymerization in the solid state. That is, the polyester copolymer recovered as described above can be polymerized further in the solid state, thereby increasing chain length. Such polymerization in the solid state is also referred to as a solid state polymerization (SSP). Such a solid state polymerization advantageously allows one to further increase the number average molecular weight of the polyester copolymer. It can further advantageously enhance the mechanical and rheological properties of polyester copolymers before injection blow molding or extruding. The solid state polymerization preferably comprises heating the polyester copolymer in the essential or complete absence of oxygen and water, for example by means of a vacuum or purging with an inert gas.

Advantageously the process according to the invention can therefore comprise:
a melt polymerization wherein the above described monomers are polymerized in a melt to produce a polyester copolymer melt product;
an optional pelletisation wherein the polyester copolymer melt product is converted into pellets, and the optional drying of the pellets under vacuum or with the help of inert gas purging;
a solid state polymerization of the polyester copolymer melt product, optionally in the form of pellets, at a temperature above the Tg of the polyester copolymer melt product and below the melt temperature of the polyester copolymer melt product.

For the present invention, the solid state polymerization may suitably be carried out at a temperature in the range from equal to or more than 150° C. to equal to or less than 220° C. The solid state polymerization may suitably be carried out at ambient pressure (i.e. 1.0 bar atmosphere corresponding to 0.1 MegaPascal) whilst purging with a flow of an inert gas (such as for example nitrogen or argon) or may be carried out at a vacuum, for example a pressure equal to or below 100 millibar (corresponding to 0.01 MegaPascal).

The solid state polymerization may suitably be carried out for a period up to 120 hours, more suitably for a period in the range from equal to or more than 2 hours to equal to or less than 60 hours. The duration of the solid state polymerization may be tuned such that a desired final number average molecular weight for the polyester copolymer is reached.

The present invention further provides a polyester copolymer, preferably obtained or obtainable by a process according to the invention as described above, containing or consisting of the following repeating units:
in the range from equal to or more than 45.0 mole % to equal to or less than 99.9 mole %, based on the total amount of moles of repeating units within the polyester copolymer, of one or more bicyclic diol-oxalate repeating units chosen from the group consisting of isosorbide-oxalate, isoidide-oxalate, isomannide-oxalate, 2,3:4,5-di-O-methylene-galactitol-oxalate and 2,4:3,5-di-O-methylene-D-mannitol-oxalate;
in the range from equal to or more than 0.1 mole % to equal to or less than 50.0 mole %, based on the total amount of moles of repeating units within the polyester copolymer, of one or more bicyclic diol-linear C3-C12 dicarboxylate repeating units;
optionally in the range from equal to or more than 0.0 mole % to equal to or less than 5.0 mole %, based on the total amount of moles of repeating units within the polyester copolymer, of one or more additional repeating units, wherein the molar ratio of bicyclic diol-oxalate repeating units to bicyclic diol-linear C3-C12 dicarboxylate repeating units is equal to or more than 1:1, more preferably equal to or more than 1.5:1. Such polyester copolymer preferably has a number average molecular weight of equal to or more than 4000 grams/mole and preferably has a glass transition temperature of less than 160° C., preferably equal to or less than 140° C.

More preferably, such polyester copolymer is devoid of any additional repeating units and preferably such polyester copolymer essentially consists of or completely consists of the one or more bicyclic diol-oxalate repeating units and the one or more bicyclic diol-linear C3-C12 dicarboxylate repeating units. More preferably the one or more bicyclic diol-oxalate repeating units are 1,4:3,6-dianhydrohexitol-oxalate repeating units. Hence, more preferably the polyester copolymer is a polyester copolymer essentially consisting of or solely consisting of:

A) in the range from 50.0% to 99.9%, based on the total amount of repeating units, of 1,4:3,6-dianhydrohexitol-oxalate repeating units having the structural formula (VIII):

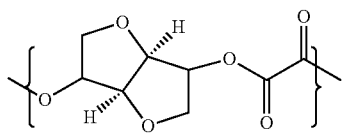
(VIII)

B) in the range from 0.1% to 50.0%, based on the total amount of repeating units, of 1,4:3,6-dianhydrohexitol-linear C3-C12 dicarboxylate repeating units having the structural formula (IX):

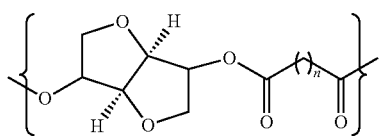
(IX)

wherein n suitably represents a number of —[$CH_2$]— units and wherein n is a number in the range from 1 to 10, with preferences as described for n before; and wherein the ratio of repeating units with formula (VIII) to repeating units with formula (IX) (that is, the repeating units with formula (VIII): repeating units with formula (IX) ratio) is equal to or more than 1:1, more preferably equal to or more than 1.5:1.

Suitably the percentages of the repeating units are mole percentages, suitably the amounts of repeating units are mole amounts and suitably the ratio is a molar ratio.

For some applications it can be advantageous for the polyester copolymer to have a ratio of repeating units with formula (VIII) to repeating units with formula (IX) in the range from equal to or more than 2:1 to equal to or less than 20:1. For other applications it can be advantageous for the polyester copolymer to have a ratio of repeating units with formula (VIII) to repeating units with formula (IX) in the range from equal to or more than 1.5:1 to equal to or less than 2:1.

In line with the indications above, the repeating units may be distributed along the polyester copolymer in an alternating manner, at random or in blocks.

Such polyester copolymer preferably has a number average molecular weight of equal to or more than 4000 grams/mole and preferably has a glass transition temperature of less than 160° C. Further preferences for the above polyester copolymer (for example for the bicyclic diols and/or linear C3-C12 dicarboxylates, number average molecular weight and glass transition temperature) are as described previously herein for the polyester copolymers.

Examples of polyester copolymers according to the invention include poly(isosorbide-oxalate/malonate), poly(isosorbide-oxalate/succinate), poly(isosorbide-oxalate/glutarate), poly(isosorbide-oxalate/adipate), poly(isosorbide-oxalate/pimelate), poly(isosorbide-oxalate/suberate), poly(isosorbide-oxalate/azelate) and poly(isosorbide-oxalate/sebacate).

Such polyester copolymers preferably have a number average molecular weight of equal to or more than 4000 grams/mole and preferably have a glass transition temperature of less than 160° C., more preferably equal to or less than 140° C. Further preferences for number average molecular weight and glass transition temperature are as described previously herein for the polyester copolymers.

The polyester copolymer can suitably be combined with additives and other polymers and therefore the invention further provides a composition containing the polyester copolymer according to the invention and in addition one or more additives and/or additional (other) polymers.

Such composition can for example comprise, as additive, nucleating agents. These nucleating agents can be organic or inorganic in nature. Examples of nucleating agents are talc, calcium silicate, sodium benzoate, calcium titanate, boron nitride, zinc salts, porphyrins, chlorin and phlorin.

The composition according to the invention can also comprise, as additive, nanometric (i.e. having particles of a nanometric size) or non-nanometric and functionalized or non-functionalized fillers or fibres of organic or inorganic nature. They can be silicas, zeolites, glass fibres or beads, clays, mica, titanates, silicates, graphite, calcium carbonate, carbon nanotubes, wood fibres, carbon fibres, polymer fibres, proteins, cellulose fibres, lignocellulose fibres and nondestructured granular starch. These fillers or fibres can make it possible to improve the hardness, the stiffness or the permeability to water or to gases. The composition can comprise from 0.1% to 75% by weight, for example from 0.5% to 50% by weight, of fillers and/or fibres, with respect to the total weight of the composition. The composition can also be of composite type, that is to say can comprise large amounts of these fillers and/or fibres.

The composition can also comprise, as additive, opacifying agents, dyes and pigments. They can be chosen from cobalt acetate and the following compounds: HS-325 Sandoplast® Red BB, which is a compound carrying an azo functional group also known under the name Solvent Red 195, HS-510 Sandoplast® Blue 2B, which is an anthraquinone, Polysynthren® Blue R and Clariant® RSB Violet.

The composition can also comprise, as additive, a processing aid for reducing the pressure in the processing device. A mould-release agent, which makes it possible to reduce the adhesion to the equipment for shaping the polyester, such as the moulds or the rollers of calendering devices, can also be used. These agents can be selected from fatty acid esters and amides, metal salts, soaps, paraffins or hydrocarbon waxes. Specific examples of these agents are zinc stearate, calcium stearate, aluminium stearate, stearamide, erucamide, behenamide, beeswax or Candelilla wax.

The composition can also comprise other additives, such as stabilizers, for example light stabilizers, UV stabilizers and heat stabilizers, fluidifying agents, flame retardants and antistats. It can also comprise primary and/or secondary antioxidants. The primary antioxidant can be a sterically hindered phenol, such as the compounds Hostanox® 0 3, Hostanox® 0 10, Hostanox® 0 16, Ultranox® 210, Ultranox®276, Dovernox® 10, Dovernox® 76, Dovernox® 3114, Irganox® 1010 or Irganox® 1076. The secondary antioxidant can be trivalent phosphorous-comprising compounds, such as Ultranox® 626, Doverphos® S-9228 or Sandostab® P-EPQ.

In addition, the composition can comprise one or more additional polymers other than the polyester copolymer according to the invention. Such additional polymer(s) can suitably be chosen from the group consisting of polyamides, polystyrene, styrene copolymers, styrene/acrylonitrile copolymers, styrene/acrylonitrile/butadiene copolymers, polymethyl methacrylates, acrylic copolymers, poly(ether/imide)s, polyphenylene oxides, such as poly(2,6-dimethylphenylene oxide), polyphenylene sulfide, poly(ester/carbonate)s, polycarbonates, polysulphones, polysulphone ethers, polyetherketones and blends of these polymers.

The composition can also comprise, as additional polymer, a polymer which makes it possible to improve the impact properties of the polymer, in particular functional polyolefins, such as functionalized polymers and copolymers of ethylene or propylene, core/shell copolymers or block copolymers.

The compositions according to the invention can also comprise, as additional polymer(s), polymers of natural origin, such as starch, cellulose, chitosans, alginates, proteins, such as gluten, pea proteins, casein, collagen, gelatin or lignin, it being possible or not for these polymers of natural origin to be physically or chemically modified. The starch can be used in the destructured or plasticized form. In the latter case, the plasticizer can be water or a polyol, in particular glycerol, polyglycerol, isosorbide, sorbitans, sorbitol, mannitol or also urea. Use may in particular be made, in order to prepare the composition, of the process described in the document WO 2010/0102822 A1.

The composition can suitably be manufactured by conventional methods for the conversion of thermoplastics. These conventional methods may comprise at least one stage of melt or softened blending of the polymers and one stage of recovery of the composition. Such blending can for example be carried out in internal blade or rotor mixers, an external mixer, or single-screw or co-rotating or counter-rotating twin-screw extruders. However, it is preferred to carry out this blending by extrusion, in particular by using a co-rotating extruder. The blending of the constituents of the composition can suitably be carried out at a temperature ranging from 220 to 300° C., preferably under an inert atmosphere. In the case of an extruder, the various constituents of the composition can suitably be introduced using introduction hoppers located along the extruder.

The invention also relates to an article comprising the polyester copolymer or a composition comprising a polyester copolymer and one or more additives and/or additional polymers. The polyester copolymer may conveniently be used in the manufacturing of films, fibres, injection moulded parts and packaging materials, such as for example receptacles. As explained above, the use of the polyester copolymer is especially advantageous where such films, fibres, injection moulded parts or packaging materials need to be heat-resistant or cold-resistant.

The article can also be a fibre for use in the textile industry. These fibres can be woven, in order to form fabrics, or also nonwoven.

The article can also be a film or a sheet. These films or sheets can be manufactured by calendering, cast film extrusion or film blowing extrusion techniques. These films can be used for the manufacture of labels or insulators.

This article can also be a receptacle, it being possible for this receptacle to be used for hot filling. This article can be manufactured from the polyester copolymer or a composition comprising a polyester copolymer and one or more additives and/or additional polymers using conventional conversion techniques. The article can also be a receptacle for transporting gases, liquids and/or solids. The receptacles concerned may be baby's bottles, flasks, bottles, for example sparkling or still water bottles, juice bottles, soda bottles, carboys, alcoholic drink bottles, medicine bottles or bottles for cosmetic products, dishes, for example for ready-made meals or microwave dishes, or also lids. These receptacles can be of any size.

The article may for example be suitably manufactured by extrusion-blow moulding, thermoforming or injection-blow moulding.

The present invention therefore conveniently provides a method of manufacturing an article, comprising the following steps: 1) the provision of a polyester copolymer as described above; 2) melting the polyester copolymer, and optionally one or more additives and/or one or more additional polymers, to thereby produce a polymer melt; and 3) extrusion-blow moulding, thermoforming and/or injection-blow moulding the polymer melt into the article.

The article can also be manufactured according to a process comprising a stage of application of a layer of polyester in the molten state to a layer based on organic polymer, on metal or on adhesive composition in the solid state. This stage can be carried out by pressing, overmoulding, lamination, extrusion-lamination, coating or extrusion-coating.

Examples

Analytical Methods:

In the below examples, the weight average molecular weight (Mw) and the number average molecular weight (Mn) have been determined by means of gel permeation chromatography (GPC). GPC measurements were performed at 25° C. For the calculation polystyrene standards were used. As eluent a solvent mixture of chloroform:2-chlorophenol 6:4 (vol/vol) was used. The GPC measurements were carried out under these conditions on a Merck-Hitachi LaChrom HPLC system equipped with two PLgel 5 micrometer (μm) MIXED-C (300×7.5 mm) columns. Calculation of the molecular weights was carried out with Cirrus™ PL DataStream software.

The glass transition temperature of the polyester polymers and copolymers in the below examples was determined using differential scanning calorimetry (DSC) with heating rate 10° C./minute in a nitrogen atmosphere. In the first heating cycle, a glass transition, (Tg), was observed.

The content of the monomer units in the polyester polymers and copolymers of the below examples was determined by proton nuclear magnetic resonance ($^1$H NMR).

The content of the monomer units in the polyester polymers and copolymers of the below examples was determined by proton nuclear magnetic resonance ($^1$H NMR). The content of diacid monomer units in polymers were determined using 1,2-dideutero-1,1,2,2-tetrachloroethane (TCE-d2) as solvent and a small amount of 1,1,2,2-tetrachloroethane as a reference. Peak assignments are set using the TCE peak at a chemical shift of 6.04 ppm. The proton peak on C2 and C6 of isosorbide connected to oxalate is at chemical shifts of 5.29-5.43 ppm is integrated and the integral is set at 1.000 for the two protons on C2 and C6 of isosorbide. The proton peak on C2 and C6 of isosorbide connected to linear dicarboxylate is integrated at chemical shifts of 5.11-5.26 ppm, and the integral is x for the two protons on C2 and C6 of isosorbide.

The content of linear C3-C12 carboxylic diacids in the polyester polymers and copolymers can subsequently be calculated as follows:

linear C3-C12 carboxylic diacids content (mole %)=100*x/(x+1)

Comparative Example 1: Preparation of an Poly(Isosorbide-Oxalate) Polyester Polymer by Polymerization of Isosorbide and Diphenyl Oxalate 14.62 gram (g) of isosorbide (to be abbreviated as ISO hereinafter, 100.05 millimol (mmol), 24.82 g of diphenyl oxalate (to be abbreviated as DPO hereinafter, 102.45 mmol), 8.3 milligram (mg) of Irganox 1010 and 9.2 mg Hostanox PEPQ were weighted into a 100 milliliter (mL) glass reactor equipped with a mechanical stirrer, nitrogen gas inlet, a distillation head that connected the glass reactor to a condenser and a receiver to collect the condensation products. The glass reactor was heated by means of an oil bath.

Transesterification and Pre-Polycondensation Stage:

The reactor contents were heated in a nitrogen atmosphere until they melted (The exact melt temperature differed per example dependent on the exact type and amount of monomers, but in all examples a clear solution was formed at a temperature above 120° C.). As soon as the mixture melt was obtained, 2.1 mg of n-butyltinhydroxideoxide (0.01 mmol) in toluene solution were added as a catalyst. Subsequently the reactor contents were heated further until a temperature of 195° C. was obtained (herein it was assumed that the temperature of the reactor contents were equal to the temperature of the oil bath), and kept at such temperature for 120 minutes. Thereafter, the degree of vacuum was adjusted to 400 millibar (mbar) over 2 hours.

Polycondensation Stage:

The temperature was raised to 250° C. at a rate of 10° C./10 minutes and the pressure was reduced to lower than 1 millibar (mbar) over 2 hours. Phenol and unreacted diol were removed by means of distillation to obtain a poly (isosorbide-oxalate) polyester polymer.

The obtained polyester polymer had a Tg, Mw, Mn and polydispersity index (PDI) as indicated in Table I.

Comparative Example 2: Preparation of an Poly(Isosorbide-Oxalate) Polyester Polymer by Polymerization of Isosorbide and Diethyl Oxalate 14.66 gram (g) of isosorbide (to be abbreviated as ISO hereinafter, 100.21 millimol (mmol), 15.83 g of diethyl oxalate (to be abbreviated as DEO hereinafter, 108.25 mmol), 14.3 milligram (mg) of Irganox 1010 and 9.2 mg Hostanox PEPQ were weighted into a 100 milliliter (mL) glass reactor equipped with a mechanical stirrer, nitrogen gas inlet, a distillation head that connected the glass reactor to a condenser and a receiver to collect the condensation products. The glass reactor was heated by means of an oil bath.

Transesterification and Pre-Polycondensation Stage:

The reactor contents were heated in a nitrogen atmosphere until they dissolved. As soon as a clear solution was obtained, 2.1 mg of n-butyltinhydroxideoxide (0.01 mmol) in toluene solution were added as a catalyst. Subsequently the reactor contents were heated further until a temperature of 180° C. was obtained (herein it was assumed that the temperature of the reactor contents were equal to the temperature of the oil bath), and kept at such temperature for 480 minutes. Thereafter, the degree of vacuum was adjusted to 400 millibar (mbar) over 2 hours.

Polycondensation Stage:

The temperature was raised to 250° C. at a rate of 10° C./10 minutes and the pressure was reduced to lower than 1 millibar (mbar) over 2 hours, then continued another 4 hours to obtain a dark-coloured, poly(isosorbide-oxalate) polyester polymer.

The obtained polyester polymer had a weight average molecular weight (Mw) of 3200, a number average molecular weight (Mn) of 1700 and polydispersity index (PDI=1.88) as indicated in Table I.

Comparative Example 3: Preparation of an Poly(Isosorbide-Oxalate) Polyester Polymer by Polymerization of Isosorbide and Oxalic Acid 14.61 gram (g) of isosorbide (to be abbreviated as ISO hereinafter, 99.91 millimol (mmol)), 9.03 g of oxalic acid (to be abbreviated as OA hereinafter, 100.03 mmol), were weighted into a 100 milliliter (mL) glass reactor equipped with a mechanical stirrer, nitrogen gas inlet, a distillation head that connected the glass reactor to a condenser and a receiver to collect the condensation products. The glass reactor was heated by means of an oil bath.

Transesterification and Pre-Polycondensation Stage:

The reactor contents were heated in a nitrogen atmosphere until they melt at 100° C. As soon as a clear solution was obtained, 2.1 mg of n-butyltinhydroxideoxide (0.01 mmol) in toluene solution were added as a catalyst. Subsequently the reactor contents were heated further until a temperature of 150° C. was obtained (herein it was assumed that the temperature of the reactor contents were 10° C. lower than the temperature of the oil bath), and kept at such temperature for 360 minutes. Thereafter, the degree of vacuum was adjusted to 400 millibar (mbar) over 2 hours.

Polycondensation Stage:

The temperature was raised to 230° C. at a rate of 10° C./10 minutes and the pressure was reduced to lower than 1 millibar (mbar) over 2 hours, then continued another 3 hours to obtain a dark viscous liquid containing merely very low molecular weight polymers of which the molecular weight could not be determined.

Comparative examples 2 and 3 illustrate that when using oxalic acid or diethyloxalate it is not possible to obtain a polyester polymer with a commercially interesting molecular weight.

Comparative Example 4: Preparation of an Poly(Isosorbide-Adipate) Polyester Copolymer by Polymerization of Isosorbide and Adipate 7.69 grams (g) of Isosorbide (to be abbreviated as ISO hereinafter, 49.05 millimol (mmol); 16.00 g of di(4-methylphenyl) adipate (to be abbreviated as DMPA hereinafter, 49.06 mmol); and 12.1 milligrams (mg) of Irganox 1010 (an antioxidant) and 11.0 mg of Hostanox PEPQ (another antioxidant) were weighted into a 100 milliliter (mL) glass reactor equipped with a mechanical stirrer, nitrogen gas inlet and a distillation head that connected the glass reactor to a condenser and receiver to collect condensation products. The glass reactor was heated by means of an oil bath.

The reactor contents were heated in a nitrogen atmosphere until they melted. As soon as the mixture melt was obtained, 2.1 mg of n-butyltinhydroxideoxide (0.01 mmol) in toluene solution were added as a catalyst. Subsequently the reactor contents were heated further until a temperature of 195° C. was obtained (herein it was assumed that the temperature of the reactor contents were equal to the temperature of the oil bath), and kept at such temperature for 120 minutes. Thereafter, the degree of vacuum was adjusted to 400 millibar (mbar) over 2 hours. The temperature was raised to 225° C. at a rate of 1° C./min and the pressure was reduced to lower than 1 millibar (mbar) over 1.5 hours. Phenol and unreacted diol were removed by means of distillation to obtain a poly(isosorbide oxalate) polyester copolymer. The resulting polyester copolymer had a glass transition temperature (Tg), weight average molecular weight (Mw), number average molecular weight (Mn) and polydispersity index as indicated in Table I.

Example 5: Preparation of a Poly(Isosorbide-Oxalate/Adipate) Polyester Copolymer by Polymerizing Oxalate, Isosorbide and Adipate Example 2 was carried out as example 1, except that 11.46 g of Isosorbide (to be abbreviated as ISO hereinafter, 78.37 mmol), 15.03 g of Diphenyl Oxalate (to be abbreviated as DPO hereinafter, 62.03 mmol), 4.99 g of di(4-methylphenyl) adipate (to be abbreviated as DMPA hereinafter, 15.28 mmol), 7.5 mg of Irganox 1010 (an antioxidant) and 7.3 mg of Hostanox PEPQ (another antioxidant) were weighted into the 100 milliliter (mL) glass reactor.

The resulting polyester copolymer contained 19.1 mole % adipate monomer in the polyester copolymer and had a Tg, Mw, Mn and polydispersity index as indicated in Table I.

Comparative Example 6: Preparation of an Poly(Isosorbide-Oxalate) Polyester Copolymer by Polymerization of Isosorbide and Oxalate 14.62 g of Isosorbide (to be abbreviated as ISO hereinafter, 100.05 mmol), 24.82 g of Diphenyl Oxalate (to be abbreviated as DPO hereinafter, 102.45 mmol), 8.3 mg of Irganox 1010 and 9.2 mg Hostanox PEPQ were weighted into a 100 milliliter (mL) glass reactor equipped with a mechanical stirrer, nitrogen gas inlet and a distillation head that connected the glass reactor to a condenser and receiver to collect condensation products. The glass reactor was heated by means of an oil bath.

The reactor contents were heated in a nitrogen atmosphere until they melted. As soon as the mixture melt was obtained, 2.1 mg of n-butyltinhydroxideoxide (0.01 mmol) in toluene solution were added as a catalyst. Subsequently the reactor contents were heated further until a temperature of 195° C. was obtained (herein it was assumed that the temperature of the reactor contents were equal to the temperature of the oil bath), and kept at such temperature for 120 minutes. Thereafter, the degree of vacuum was adjusted to 400 millibar (mbar) over 2 hours. The temperature was raised to 250° C. at a rate of 10° C./10 minutes and the pressure was reduced to lower than 1 millibar (mbar) over 2 hours. Phenol and unreacted diol were removed by means of distillation to obtain a poly(isosorbide-oxalate) polyester copolymer. The polyester copolymer and had a Tg, Mw, Mn and polydispersity index as indicated in Table I.

Example 7: Preparation of a Poly(Isosorbide-Oxalate/Adipate) Polyester Copolymer by Polymerizing Oxalate, Isosorbide and Adipate 14.69 grams (g) of Isosorbide (to be abbreviated as ISO hereinafter, 100.48 mmol), 15.11 g of Diphenyl Oxalate (to be abbreviated as DPO hereinafter, 62.36 mmol), 7.55 g of di(Vinyl) adipate (to be abbreviated as DVA hereinafter, 38.10 mmol), 9.2 mg of Irganox 1010 (an antioxidant) and 11.4 mg of Hostanox PEPQ (another antioxidant) were weighted in 100 mL glass reactor equipped with a mechanical stirrer, inlet of nitrogen gas and a distillation head that connected to condenser and receiver to collect condensation products. The glass reactor was heated by means of an oil bath.

The reactor contents were heated in a nitrogen atmosphere until they melted. As soon as a clear mixture was obtained at 155° C., 2.1 mg of n-butyltinhydroxideoxide (0.01 mmol) in toluene solution was added as a catalyst. Subsequently the reactor contents were heated further until a temperature of 195° C. was obtained (herein it was assumed that the reactor contents were equal to the temperature of the oil bath), and kept at such temperature for 180 minutes. Thereafter, the degree of vacuum was adjusted to 400 mbar over 2 hours. The temperature was raised to 225° C. in 1° C./min and the pressure was reduced to lower than 1 mbar over 1.5 hours. Phenol was removed by means of distillation to obtain isosorbide oxalate/adipate polyester copolymer. The resulting polyester copolymer contained 19.2 mole % adipate monomer in the polyester copolymer and had a glass transition temperature (Tg) value of 85° C., a number average molecular weight (Mn) of 4100 g/mol and a weight average molecular weight (Mw) of 8300 g/mol.

Comparative Example 8: Preparation of an Poly(Isosorbide-Adipate) Polyester Polymer by Polymerization of Isosorbide and Adipate 14.69 g of Isosorbide (to be abbreviated as ISO hereinafter, 100.54 mmol), 20.03 g of Divinyl adipate (to be abbreviated as DVA hereinafter, 101.04 mmol), 8.6 mg of Irganox 1010 and 8.7 mg Hostanox PEPQ were weighted in 100 mL glass reactor equipped with a mechanical stirrer, inlet of nitrogen gas and a distillation head that connected to condenser and receiver to collect condensation products. The reactor started to heating in a nitrogen atmosphere, as soon as the mixture molt, added 2.1 mg of n-butyltinhydroxideoxide (0.01 mmol) in toluene solution as a catalyst, then heated to 195° C. of oil temperature, and kept 180 minutes. Thereafter, the degree of vacuum was adjusted to 400 mbar over 2 hours. the temperature was raised to 235° C. in 10° C./10 minutes and reduced pressure to lower than 1 mbar over 2 hours, and continued vacuum at 235° C. for another 6 hours to obtain poly(isosorbide adipate). The resulting polyester polymer had a Tg value of 26° C., an Mn of 3800 g/mol, Mw of 9100 g/mol.

In the below Table I:

ISO=Isosorbide

DEO=Diethyloxalate

OA=Oxalic acid

DPO=Diphenyloxalate

DMPA=Di(4-MethylPhenyl) Adipate

DVA=Di(Vinyl) Adipate PDI=polydispersity index

Mw=weight average molecular weight

Mn=number average molecular weight

Tg=glass transition temperature

DPO:lin.C3-C12 diacid or derivative molar ratio=DPO monomer: linear C3-C12 carboxylic diacid or derivative thereof monomer molar ratio. This molar ratio is expected to be representative for the molar ratio of isosorbide-oxalate repeating units to isosorbide-linear C3-C12 dicarboxylate repeating units in the resulting polyester copolymer.

Mole % lin. C3-C12 dicarboxylate in polymer=linear C3-C12 dicarboxylate monomer unit mole percentage in the resulting polymer (mole %).

TABLE I

Monomers used and properties of the resulting polyester copolymer

| Example | ISO (mmol) | Oxalic diester or oxalic acid in the feed (mmol) | | Linear C3-C12 diacid or derivative in the feed (mmol) | | DPO:lin. C3-C12 diacid or derivative molar ratio | Mole % lin. C3-C12 dicarboxylate in polymer | Tg (° C.) | Mn (g/mol) | Mw (g/mol) | PDI |
|---|---|---|---|---|---|---|---|---|---|---|---|
| 1* | 100.05 | DPO | 102.45 | n.a. | n.a. | n.a. | n.a. | 165 | 12900 | 26500 | 2.05 |
| 2* | 100.21 | DEO | 108.25 | n.a. | n.a. | n.a. | n.a. | 91 | 1700 | 3200 | 1.88 |
| 3* | 99.91 | OA | 100.03 | n.a. | n.a. | n.a. | n.a. | n.d. | Very low | Very low | n.d. |
| 4* | 49.05 | n.a. | n.a. | DMPA | 49.06 | n.a. | n.a. | 25 | 8650 | 17300 | 2.00 |
| 5 | 78.37 | DPO | 62.03 | DMPA | 15.28 | 4.06 | 9.4 | 124 | 9900 | 20800 | 2.10 |
| 6* | 100.05 | DPO | 102.45 | n.a. | n.a. | n.a. | n.a. | 165 | 12900 | 26500 | 2.05 |
| 7 | 100.48 | DPO | 60.90 | DVA | 40.12 | 1.52 | 19.2 | 85 | 4100 | 8300 | 2.02 |
| 8* | 100.54 | n.a. | n.a. | DVA | 101.04 | n.a. | n.a. | 26 | 3800 | 9100 | 2.39 |

In all examples 0.01 mmol of n-butyltinhydroxideoxide catalyst was used.

n.a. = not applicable;

n.d. = not determined;

*indicates a comparative example.

The invention claimed is:

1. A polyester copolymer, having a number average molecular weight of equal to or more than 4000 gram/mole and having a glass transition temperature from equal to or more than 60° C. to equal to or less than 130° C., comprising:

(a) in the range from equal to or more than 45.0 mole % to equal to or less than 50.0 mole %, based on a total amount of moles of monomer units within the polyester copolymer, of one or more bicyclic diol monomer units, wherein one or more bicyclic diol monomer units is selected from the group consisting of isosorbide, isoidide, isomannide, 2,3:4,5-di-O-methylene-galactitol and 2,4:3,5-di-O-methylene-D-mannitol;

(b) in the range from equal to or more than 25.0 mole % to equal to or less than 45.0 mole %, based on the total amount of moles of monomer units within the polyester copolymer, of an oxalate monomer unit; and (c) in the range from equal to or more than 5.0 mole % to equal to or less than 25.0 mole %, based on the total amount of moles of monomer units within the polyester copolymer, of one or more linear dicarboxylate monomer units selected from a succinate monomer unit or an adipate monomer unit or a mixture thereof, wherein the total amount of moles of monomer units in the polyester copolymer is 100.0 mole %, wherein the polyester copolymer has a polydispersity index in the range from 1.6 to equal to or less than 2.6.

* * * * *